(12) United States Patent
Georgiev et al.

(10) Patent No.: US 10,482,222 B2
(45) Date of Patent: *Nov. 19, 2019

(54) METHODS, APPARATUS, AND ARTICLES OF MANUFACTURE TO ENCODE AUXILIARY DATA INTO TEXT DATA AND METHODS, APPARATUS, AND ARTICLES OF MANUFACTURE TO OBTAIN ENCODED DATA FROM TEXT DATA

(71) Applicant: The Nielsen Company (US), LLC, New York, NY (US)

(72) Inventors: Nikolay Georgiev, San Jose, CA (US); Leonid Ayzenshtat, Jacksonville, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/208,175

(22) Filed: Dec. 3, 2018

(65) Prior Publication Data

US 2019/0180007 A1   Jun. 13, 2019

Related U.S. Application Data

(63) Continuation of application No. 14/728,532, filed on Jun. 2, 2015, now Pat. No. 10,157,270, which is a
(Continued)

(51) Int. Cl.
*G06F 21/16* (2013.01)
*G09C 5/00* (2006.01)
(Continued)

(52) U.S. Cl.
CPC .............. *G06F 21/16* (2013.01); *G06F 16/84* (2019.01); *G06F 21/10* (2013.01); *G09C 5/00* (2013.01)

(58) Field of Classification Search
CPC ....................................................... G06F 21/16
See application file for complete search history.

(56) References Cited

U.S. PATENT DOCUMENTS

| 4,906,991 A | 3/1990 | Fiala et al. |
| 5,239,298 A | 8/1993 | Wei |

(Continued)

OTHER PUBLICATIONS

IP Australia, "Patent Examination Report No. 2," mailed in connection with Application No. 2013204220, dated Jun. 4, 2015, 2 pages.

(Continued)

*Primary Examiner* — Simon P Kanaan
(74) *Attorney, Agent, or Firm* — Hanley, Flight & Zimmerman, LLC

(57) ABSTRACT

Methods, apparatus, and articles of manufacture to encode auxiliary data into text data and methods, apparatus, and articles of manufacture to obtain encoded data from text data are disclosed. An example method includes detecting, using a processor, a first symbol present in first text data, the first symbol including a white space character; mapping the first symbol to first data using the processor; detecting, using the processor, a second symbol present in the first text data by detecting a white space character or a flow control character; mapping, using the processor, the second symbol to a first bit position of the first data in encoded data; and determining the encoded data, using the processor, based on placing the first data in the first bit position.

18 Claims, 9 Drawing Sheets

Related U.S. Application Data continuation of application No. 13/691,522, filed on Nov. 30, 2012, now Pat. No. 9,087,459.

(51) Int. Cl.
  *G06F 21/10* (2013.01)
  *G06F 16/84* (2019.01)

(56) References Cited

U.S. PATENT DOCUMENTS

| | | | |
|---|---|---|---|
| 5,727,092 | A | 3/1998 | Sandford, II et al. |
| 5,937,066 | A | 8/1999 | Gennaro et al. |
| 5,970,140 | A | 10/1999 | Sandford, II et al. |
| 6,021,196 | A | 2/2000 | Sandford, II et al. |
| 6,044,155 | A | 3/2000 | Thomlinson et al. |
| 6,065,119 | A | 5/2000 | Sandford, II et al. |
| 6,174,170 | B1 | 1/2001 | Olmedo |
| 6,289,128 | B1 | 9/2001 | Allen |
| 6,353,672 | B1 | 3/2002 | Rhoads |
| 6,778,682 | B2 | 8/2004 | Rhoads |
| 7,164,778 | B1 | 1/2007 | Nakamura et al. |
| 7,197,156 | B1 | 3/2007 | Levy |
| 7,424,132 | B2 | 9/2008 | Rhoads |
| 7,617,231 | B2 | 11/2009 | Moon et al. |
| 7,730,037 | B2 | 6/2010 | Jajodia et al. |
| 8,073,915 | B1 | 12/2011 | Nandy |
| 8,082,320 | B1 | 12/2011 | Moorer |
| 8,701,119 | B1 | 4/2014 | Ross |
| 9,042,554 | B2 | 5/2015 | Georgiev et al. |
| 9,614,675 | B2 | 4/2017 | Georgiev et al. |
| 10,157,270 | B2 | 12/2018 | Georgiev et al. |
| 2001/0046298 | A1 | 11/2001 | Terada et al. |
| 2003/0014634 | A1 | 1/2003 | Petrovic |
| 2003/0217272 | A1 | 11/2003 | Agrawal et al. |
| 2004/0143742 | A1 | 7/2004 | Muratani |
| 2005/0039021 | A1 | 2/2005 | Alattar et al. |
| 2005/0055554 | A1 | 3/2005 | Sion et al. |
| 2007/0110237 | A1 | 5/2007 | Tehranchi et al. |
| 2009/0115576 | A1 | 5/2009 | Schuessler |
| 2011/0055166 | A1 | 3/2011 | Stephenson et al. |
| 2011/0246505 | A1 | 10/2011 | Jung |
| 2012/0030546 | A1 | 2/2012 | Alattar et al. |
| 2012/0192059 | A1 | 7/2012 | Laskaris et al. |
| 2014/0153715 | A1 | 6/2014 | Georgiev et al. |
| 2014/0157439 | A1 | 6/2014 | Ayzenshtat et al. |
| 2014/0157440 | A1 | 6/2014 | Georgiev et al. |
| 2014/0157441 | A1 | 6/2014 | Georgiev et al. |

OTHER PUBLICATIONS

IP Australia, "Notice of Acceptance," mailed in connection with Application No. 2013204619, dated Jun. 3, 2015, 2 pages.
United States Patent and Trademark Office, "Advisory Action," mailed in connection with U.S. Appl. No. 13/691,515, dated Jun. 17, 2015, 4 pages.
IP Australia, "Notice of Acceptance," mailed in connection with Application No. 2013204226, dated Jun. 26, 2015, 2 pages.
Nielsen/IRI Intro Session, retrieved from http://faculty.gugua.duke.edu/.about.moorman/GeneralMills/Section1/Julie%-20Beattie%20Nielsen.ppt (38 pages).
Richard LoPinto, "Color Choice: Luminance, Chrominance and Hue: Among the tools at your disposal, the LCH Editor gives you a powerful weapon for finessing the color relationships in your images," Digital Photo Pro, Mar. 3, 2008, retrieved from http://www.digitalphotopro.com/technique/software-technique/color-choice--luminance-chrominance-and-hue.html?start=2 (2 pages).
Dr. Vipula Singh, "Digital Watermarking: A Tutorial," Cyber Journals: Multidisciplinary Journals in Science and Technology, Journal of Selected Areas in Telecommunications (JSAT), January Edition, 2011, retrieved from http://www.cyberjournals.com/Papers/Jan2011/02.pdf (12 pages).
Jessica Codr, "Unseen: An Overview of Steganopgraphy and Presentation of Associated Java Application C-Hide," retrieved from http://www.cse.wustl.edu/.about.jain/cse571-09/ftp/stegano/index.html, (22 pages).
Gary C. Kessler, "Steganography: Hiding Data Within Data," Sep. 2001, retrieved from http://www.garykessler.net/library/steganography.html (5 pages).
Alaa Jebran, "Text 2Text Steganography—Part 2," Code Project, Jun. 19, 2007, retrieved from http://www.codeproject.com/Articles/19260/Text-2Text-Steganography-Part-2 (8 pages).
TextMark—Protect you texts with digital watermarks!, retrieved from http://www.compris.com/TextMark/en/index.html (3 pages).
Matthew Kwan, "Whitespace steganography," The SNOW Home Page, Dec. 19, 2009, retrieved from http://www.darkside.com.au/snow/index.html (2 pages).
Simple text watermarking with Unicode, coderrr, Mar. 23, 2008, retrieved from http://coderr.wordpress.com/2008/03/23/simple-text-watermarking-with- -unicode/ (4 pages).
Topkara et al., "Natural Language Watermarking," retrieved from http://homes.cerias.purdue.edu/.about.mercan/spie05_5681-45_paper.pdf (12 pages).
Permutations, Variations & Combinations, http://users.telenet.be/vdmoortel/dirk/Maths/PermVarComb.html (1 page).
Richard Ishida, "Unicode controls vs. markup for bidi support," W3C Internationalization, Jun. 6, 2003, retrieved from http://users.telenet.be/vdmoortel/dirk/Maths/PermVarComb.html (5 pages).
How to protect digital works: images, photos and documents: comparison of watermarking methods and tools, retrieved from http://www.watermarker.com/how-to-protect-digital-images.aspx (2 pages).
Manage, monitor and monetize your digital photos, images and artwork, Digimarc for Images, retrieved from http://www.digimarc.com/digimarc-for-images (2 pages).
How safe is Excel encryption. Is it really secure?, Linker IT Software, retrieved from http://www.oraxcel.com/projects/encoffice/help/How_safe_is_Excel_encrypti- on.html (3 pages).
How secure is Microsoft Word 2007 encryption, Linker IT Software, retrieved from http://www.oraxcel.com/projects/encoffice/help/How_safe_is_Word_2007_encr- yption.html (3 pages).
MS Office Password Recovery Software, Rixler Software, retrieved from http://www.rixler.com/ms_office_password_recovery_software.htm (1 page).
Stellar Phoenix Office Password Recovery Pro, Office Password Recovery Pro, retrieved from http://www.officepasswordrecover.com/ (2 pages).
Tim Fisher, "3 Free Word Password Recovery Tools: Free Word Password Recovery, Remover, and Unlocker Tools for Windows," About.com, retrieved from http://pcsupport.about.com/od/toolsofthetrade/tp/word-password-recov- ery.htm (2 pages).
Wayback Machine Cache of "http://www.easypasswordfix.com" taken on Feb. 7, 2011. (2 pages).
Erik Kangas, "The Light of Knowledge," LuxSci FYI Blog, retrieved from http://luxsci.com/blog/how-secure-are-password-protected-files.html (2 pages).
Password strength, Wikipedia, retrieved from http://en.wikipedia.org/wiki/Password_strength (10 pages).
Amit Agarwal, "How to Open Password Protected PDF Documents," Digital Inspiration, retrieved from http://labnol.blogspot.com/2007/01/how-to-open-password-protected-pdf.htm- l (2 pages).
Pavel Semjanov, "How to remove security from secured PDF file," GuaPDF, Jul. 13, 2012, retrieved from http://www.guapdf.com/ (6 pages).
Ali Hanyaloglu, "Digitally Signing PDF Documents Using Adobe Acrobat 9*: An Introduction," ScanSnap Community, Nov. 16, 2009, retrieved from http://scansnapcommunity.com/tips-tricks/1416-digitally-signing-pdf-docum- ents-using-adobe-acrobat-9-an-introduction/ (9 pages).
Information Rights Management in Office 2010. Accessed from "http://office.microsoft.com/en-us/excel-help/information-rights-manageme- nt-in-office-2010-HA010354260.aspx" on Nov. 30, 2012. (5 pages).

(56) References Cited

OTHER PUBLICATIONS

Geoff Anderson, "What is: Information Rights Management?," retrieved from http://office.microsoft.com/en-us/excel-help/information-rights-managemen- t-in-office-2010-HA010354260.aspx (3 pages).
Adobe LiveCycle Rights Management ES3, Adobe, retrieved from http://www.adobe.com/products/livecycle/rightsmanagement/ (3 pages).
The benefit of rights management: A guide to Adobe.RTM. LiveCycle. RTM. Rights Management ES software, Adobe, retrieved from http://www.adobe.com/products/livecycle/pdfs/95010482_lc_rightsmgmt_wp_ue- .pdf (8 pages).
PDF DRM, Security and Rights Management Systems, Armjisoft, retrieved from http://www.armjisoft.com/?page=pdfownerguard (4 pages).
PDF Protection, Control & Tracking, Vitrium Systems, retrieved from http://www.vitrium.com/ (4 pages).
Products and solutions, codeandsoft, retrieved from http://www.codeandsoft.com/ (1 page).
Document Security—Digital Rights Management (DRM) & Copy Protection Software, LockLizard, retrieved from http://www.locklizard.com/ (2 pages).
Rights Management for Standard Document Formats, FileOpen Document Security Blog, retrieved from http://www.fileopen.com/blog/ (4 pages).
Lip Yee Por, KokSheik Wong, and Kok Onn Chee. "UniSpaCh: A text-based data hiding method using Unicode space characters." The Journal of Systems and Software 85 (May 2012) pp. 1075-1082.
Bender, et al. "Techniques for Data Hiding," IBM Systems Journal, vol. 35, Nos. 3&4, 1996. pp. 313-336.
United States Patent and Trademark Office, "Non-Final Office Action," mailed in connection with U.S. Appl. No. 13/691,519, dated Jul. 16, 2014, 46 pages.
Tzouramanis, "A Robust Watermarking Scheme for Relational Databases," Dec. 2011, 8 pages.
United States Patent and Trademark Office, "Non-Final Office Action," mailed in connection with U.S. Appl. No. 13/691,515, 32 pages.
Kamel et al., "A Lightweight Data Integrity Scheme for Sensor Networks," 2011, 19 pages.
Qin et al., "Watermark Based Copyright Protection of Outsourced Database," 2006, 5 pages.
United States Patent and Trademark Office, "Non-Final Office Action," mailed in connection with U.S. Appl. No. 13/691,510, dated Jul. 18, 2014, 13 pages.
United States Patent and Trademark Office, "Non-Final Office Action," mailed in connection with U.S. Appl. No. 13/691,522, dated Aug. 15, 2014, 13 pages.
IP Australia, "Patent Examination Report No. 1," mailed in connection with Application No. 2013204220, dated Jul. 25, 2014, 3 pages.
IP Australia, "Patent Examination Report No. 1," mailed in connection with Application No. 2013204619, dated Aug. 28, 2014, 3 pages.
IP Australia, "Patent Examination Report No. 1," mailed in connection with Application No. 2013204226, dated Dec. 17, 2014, 4 pages.
IP Australia, "Patent Examination Report No. 1," mailed in connection with Application No. 2013204479, dated Dec. 12, 2014, 4 pages.
United States Patent and Trademark Office, "Final Office Action," mailed in connection with U.S. Appl. No. 13/691,515, dated Mar. 3, 2015, 40 pages.
United States Patent and Trademark Office, "Notice of Allowance," mailed in connection with U.S. Appl. No. 13/691,510, dated Jan. 20, 2015, 8 pages.
United States Patent and Trademark Office, "Notice of Allowance," mailed in connection with U.S. Appl. No. 13/691,522, dated Mar. 30, 2015, 9 pages.
United States Patent and Trademark Office, "Supplemental Notice of Allowability," mailed in connection with U.S. Appl. No. 13/691,510, dated Apr. 2, 2015, 2 pages.
United States Patent and Trademark Office, "Supplemental Notice of Allowability," mailed in connection with U.S. Appl. No. 13/691,510, dated May 1, 2015, 9 pages.
IP Australia, "Notice of Acceptance," mailed in connection with Application No. 2013204220, dated Jul. 23, 2015, 2 pages.
United States Patent and Trademark Office, "Non-Final Office action," mailed in connection with U.S. Appl. No. 14/705,595, dated Mar. 7, 2016, 16 pages.
United States Patent and Trademark Office, "Non-Final Office Action," mailed in connection with U.S. Appl. No. 13/691,515, dated Apr. 21, 2016, 9 pages.
United States Patent and Trademark Office, "Final Office Action," mailed in connection with U.S. Appl. No. 14/705,595, dated Aug. 23, 2016, 17 pages.
United States Patent and Trademark Office, "Notice of Allowance," mailed in connection with U.S. Appl. No. 14/705,595, dated Nov. 21, 2016, 18 pages.
United States Patent and Trademark Office, "Non-Final Office Action," mailed in connection with U.S. Appl. No. 13/691,515, dated Aug. 14, 2017, 12 pages.
United States Patent and Trademark Office, "Final Office Action," mailed in connection with U.S. Appl. No. 13/691,515, dated Nov. 10, 2016, 9 pages.
United States Patent and Trademark Office, "Notice of Allowance," mailed in connection with U.S. Appl. No. 14/728,532, dated Aug. 10, 2018, 9 pages.
United States Patent and Trademark Office, "Notice of Allowance," mailed in connection with U.S. Appl. No. 14/728,532, dated Aug. 10, 2018, 5 pages.
United States Patent and Trademark Office, "Non-Final Office Action," mailed in connection with U.S. Appl. No. 14/728,532, dated Jan. 16, 2018, 6 pages.
United States Patent and Trademark Office, "Non-Final Office Action," mailed in connection with U.S. Appl. No. 14/728,532, dated Jun. 30, 2017, 9 pages.

METHODS, APPARATUS, AND ARTICLES OF MANUFACTURE TO ENCODE AUXILIARY DATA INTO TEXT DATA AND METHODS, APPARATUS, AND ARTICLES OF MANUFACTURE TO OBTAIN ENCODED DATA FROM TEXT DATA

RELATED APPLICATIONS

This application arises from a continuation of U.S. patent application Ser. No. 14/728,532, filed Jun. 2, 2015, which is a continuation of U.S. patent application Ser. No. 13/691,522, filed Nov. 30, 2012. Priority to U.S. patent application Ser. Nos. 14/728,532 and 13/691,522 is claimed. U.S. patent application Ser. Nos. 14/728,532 and 13/691,522 are incorporated herein by reference in their respective entireties.

FIELD OF THE DISCLOSURE

This disclosure relates generally to data encoding, and, more particularly, to methods, apparatus, and articles of manufacture for encoding auxiliary information in text data and to methods, apparatus, and articles of manufacture for obtaining encoded auxiliary information from text data.

BACKGROUND

Proprietary data is sometimes shared between two parties. In some cases, the proprietary data owned by one party is easily copied or distributed by the other party to additional parties without consent of the owner.

DETAILED DESCRIPTION

Figure 1:
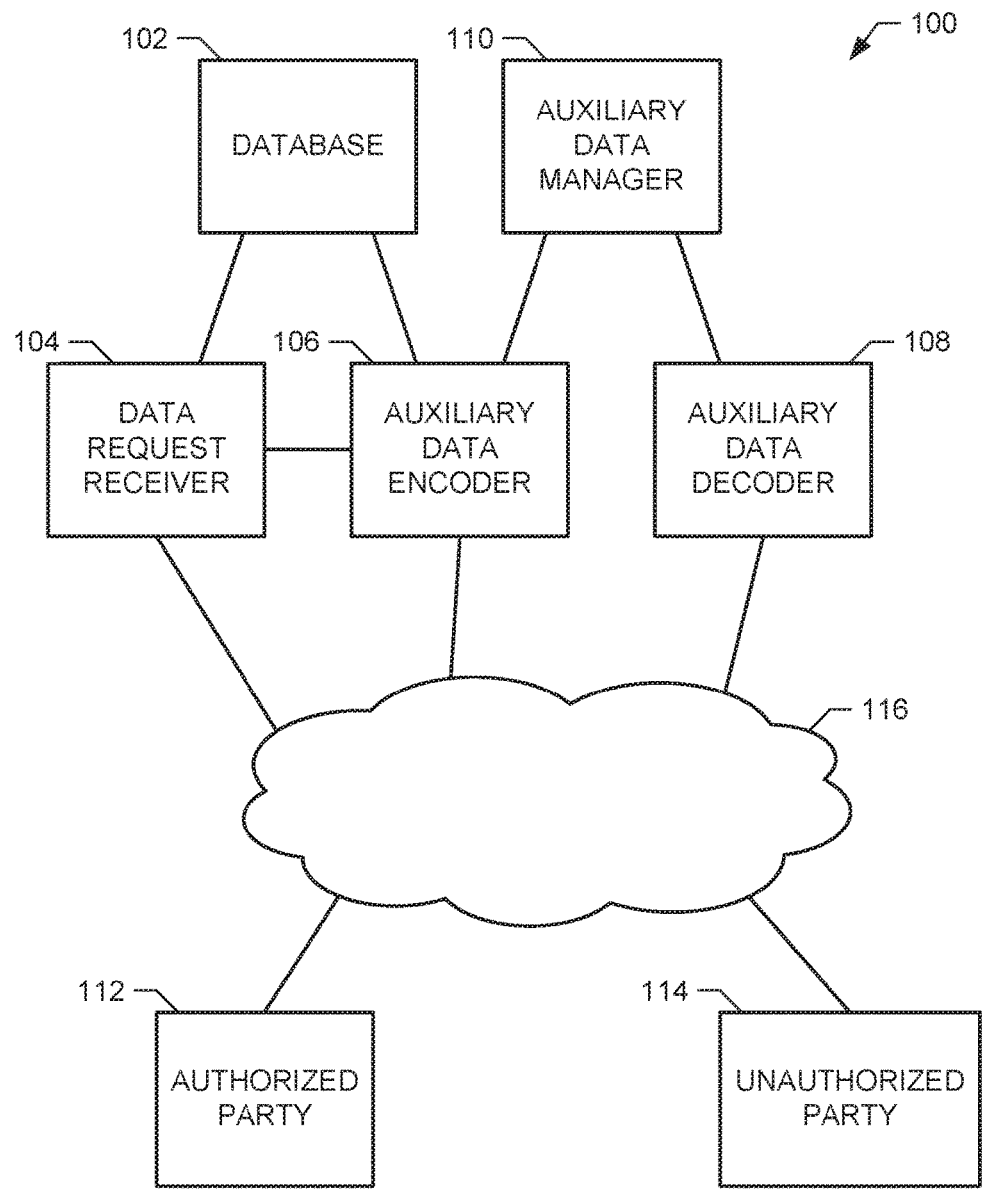
FIG. 1 is a block diagram of an example system in accordance with the teachings of this disclosure.

Data (whether copyrighted or not) can be distributed. However, once distributed a first time, the data is capable of being further distributed. Example methods, apparatus, and articles of manufacture disclosed herein enable an owner of data to uniquely identify, protect, and trace the data to detect cases of unauthorized copying or redistribution by embedding auxiliary data, also referred to herein as watermarks, in the data. In particular, example methods, apparatus, and articles of manufacture embed watermarks in the data in a robust manner, such that the watermark can still be recovered if a portion of the data is copied and/or if the data is reorganized.

Known text watermarking techniques allow embedding of information inside plain text. Some such techniques change font attributes (e.g., color and/or size), use misspelled words, rephrase text (e.g., using synonyms and narration tense), use ASCII whitespaces and tabs, use Unicode zero width characters, and/or use neuro-linguistic programming techniques. These known approaches are not well-suited for text data such as reference data including multiple, relatively small units of text data (e.g., 50 characters or less), because known techniques require a bigger corpus in order to encode the watermark data and/or these techniques negatively affect the quality of the protected data. Example methods, apparatus, and articles of manufacture disclosed herein provide an innovative approach for embedding watermarks inside alphanumeric data. Example methods, apparatus, and articles of manufacture disclosed herein may be used to robustly encode a watermark or other auxiliary data into text data or textual data. Some such example methods, apparatus, and articles of manufacture encode the watermark information into alphanumerical strings organized as words separated by white spaces.

Some example methods, apparatus, and articles of manufacture disclosed herein encode a single bit of information per white space by selectively replacing white spaces with a different white space character. Some example methods, apparatus, and articles of manufacture achieve higher encoding bit rates per white space by selecting sets of character combinations that represent similar or identical visual widths. Example higher bit rates can vary from 2 bits per white space and can go as high as 12 or more bits per white space.

For example, 4 bytes (i.e., 32 bits) of data can be encoded into a set of data units by encoding all 32 bits into one or more data units, encoding 8 bits of data and 2 bits for position data into each of 4 different strings, and/or by encoding 2 bits of data and 4 bits of position data into each of 16 different strings. Other divisions of the data may additionally or alternatively be used. In some examples, different amounts of data are encoded differently into different data units based on the number of white spaces in the data unit.

Example methods, apparatus, and articles of manufacture disclosed herein encode auxiliary data into text data by replacing white space characters in the text data with combinations of one or more non-zero-width white space characters, zero-width characters, and/or flow control characters. Such example methods, apparatus, and articles of manufacture generate encoded text data that appear to be visually similar or identical to the source text data.

By encoding data and/or position data independently into each data unit of the text data, encoding carried out using the example methods, apparatus, and articles of manufacture disclosed herein is highly resilient against data shuffling, reordering and/or partial deletion of the data because the data units are independent and the data may be redundantly encoded into the source data. Example methods, apparatus, and articles of manufacture enable watermarking using relatively few processing resources.

In some examples, the encoding is robust because the auxiliary data can be recovered from a subset of the data set as long as the subset includes at least one data unit for each bit position in the original auxiliary data. In some examples, each bit of the auxiliary data is represented by multiple data units to increase the robustness of the encoding.

As used herein, the term "symbol," as it pertains to encoding, refers to any unit of data used to represent information. Example symbols may include combinations of bits, bytes, decimal numbers, character encodings such as Unicode or ASCII characters, and/or any other unit of data. The definitions of some types of symbols, such as bytes and characters, may overlap. Such symbols may be considered to be any or all such overlapping types of data, and the term symbol is intended to be inclusive. The term "character," as used herein, refers to any alphanumeric symbol (e.g., letter or number), white space, and/or non-alphanumeric symbol (e.g., dots, boxes, arrows, etc.) that may be represented by a data encoding such as ASCII and/or Unicode, or to the encoding representation of such symbols and/or white spaces.

A disclosed example method to encode auxiliary data into text data includes selecting a portion of auxiliary data to be encoded into text data, mapping the portion of auxiliary data to a first set of one or more encoded characters representative of the portion of the auxiliary data, mapping a position of the portion of auxiliary data within the auxiliary data to a second set of one or more encoded characters representative of the portion of the auxiliary data, and generating encoded data by including the first set of encoded characters and the second set of encoded characters in the text data.

Another example method to encode auxiliary data into text data includes determining a number of white space characters in text data to be encoded with auxiliary data, mapping auxiliary data to a first set of multiple encoded characters representative of the auxiliary data based on the number of white space characters, and generating encoded data by including the first set of encoded characters in the text data.

An example method to obtain auxiliary information from text data includes detecting a first symbol, including a white space character, present in first text data, mapping the first symbol to first data, detecting a second symbol present in the first text data, mapping the second symbol to a first bit position of the first data in encoded data, and determining the encoded data based on placing the first data in the first bit position.

An example apparatus to encode auxiliary data into text data includes a data character selector, a position character selector, and a data unit encoder. The example data character selector selects a portion of auxiliary data to be encoded into text data and to map the portion of auxiliary data to a first set of one or more encoded characters representative of the portion of the auxiliary data. The example position character selector maps a position of the portion of auxiliary data within the auxiliary data to a second set of one or more encoded characters representative of the portion of the auxiliary data. The example data unit encoder generates encoded data by including the first set of encoded characters and the second set of encoded characters in the text data.

An example apparatus to obtain auxiliary data from text data includes a data character extractor, a position character extractor, and an auxiliary data assembler. The data character extractor detects a first symbol, including a white space character, present in first text data and to map the first symbol to first data. The position character extractor detects a second symbol present in the first text data and to map the second symbol to a first bit position of the first data in encoded data. The auxiliary data assembler determines the encoded data based on placing the first data in the first bit position.

Example methods, apparatus, and articles of manufacture enable content owners to secure the distributed content, prevent unauthorized usage of the data, and/or provide the means to combat copyright infringement. Example methods, apparatus, and articles of manufacture can be used, for example, to embed a watermark into all distributed data. In the event of unauthorized distribution, the watermark in the text data can be decoded to prove the origin of the data. Example methods, apparatus, and articles of manufacture can also be used to embed a client specific fingerprint to personalize the copy of data. When data is found to have been improperly distributed, the specific fingerprint may be used to identify a party who was in possession of the data prior to the improper distribution.

Some programs are capable of visually displaying characters in the text data, and thus the symbols and/or characters encoded in text data are not necessarily invisible under all circumstances. However, the characters may be considered to be substantially invisible within the scope of this disclosure when the characters are not visible when displayed in at least one manner or format (e.g., in a print-type format, in a formatting-hidden format, etc.). Furthermore, different encodings of characters may be slightly different. For example, a first character encoding representative of a space may be wider or narrower than another character encoding of a space. In other words, different encodings of a blank or white space may result in different widths of blank or white space when displayed by some computer programs or devices. As used herein, two characters are considered to be similar when they represent the same alphanumeric character or non-alphanumeric symbol (e.g., white or blank spaces, hyphens, etc.), without regard to relative widths, heights, thicknesses, or other non-substantive differences.

As used herein, the term "text data" or "textual data" refers to data encoded to represent alphanumeric characters. Example encodings of alphanumeric characters include computer character encodings such as American Standard Code for Information Interchange (ASCII), Unicode, Extended Binary Coded Decimal Interchange Code (EBCDIC), International Organization for Standardization (ISO) 8859 (and parts of ISO 8859), Unicode Transformation Formats (UTF) (and its variants), and/or Windows code pages (also referred to as ANSI code pages). Many other character encodings exist and may be used to encode text data with auxiliary data in accordance with the teachings of this disclosure. Accordingly, the term "text data" may refer to any past, present, and/or future character encodings.

FIG. 1 is a block diagram of an example system 100. The example system 100 of FIG. 1 may be used to encode auxiliary information (e.g., watermarks) into text data that may subsequently be distributed. The example system 100 may further decode text data to recover or obtain auxiliary information encoded using the system 100. Thus, subsequent to distribution of the encoded text data, the example system 100 can identify text data that has been encoded using the system 100.

The example system 100 of FIG. 1 includes a database 102, a data request receiver 104, an auxiliary data encoder 106, an auxiliary data decoder 108, and an auxiliary data manager 110. In the example of FIG. 1, the database 102, the data request receiver 104, the auxiliary data encoder 106, the auxiliary data decoder 108, and the auxiliary data manager 110 are owned or controlled by a single party (e.g., an owner or licensee of distributable data, a distributor of the data under the control of the owner or licensee of the data, etc.). In some other examples, the database 102, the data request receiver 104, the auxiliary data encoder 106, the auxiliary data decoder 108, and/or the auxiliary data manager 110 may represent a combination of multiple parties. The example system 100 further includes a party 112 authorized to receive data stored in the database 102 and a party 114 not authorized to receive such data. Any or all of the example database 102, the example data request receiver 104, the example auxiliary data encoder 106, the example auxiliary data decoder 108, the auxiliary data manager 110, and/or the example parties 112, 114 may be communicatively connected via a network 116 such as the Internet.

Any of the example blocks 102-110 of FIG. 1 may be combined, divided, and/or rearranged to form different blocks that perform fewer or more functions.

As mentioned above, the example database 102 stores data that may be distributed. In the example system 100, the data stored in the database (also referred to herein as "source data") includes (or is divisible into) data units of text. In some examples, the text represents human-readable information and is stored using character encodings that can be interpreted by a receiver of data. In addition to the numeric value of the data unit, the data unit may include organizational data, metadata, and/or other types of non-substantive data for the purposes of organization, relation, and/or distribution. In some examples, the numeric value is the entirety of the data unit. Example data includes a list of text fields and associated information. The data stored in the database 102 may be updated to add new data, to modify data present in the database 102, and/or to delete data from the database 102.

The example data request receiver 104 of FIG. 1 receives requests for data stored in the database 102. For example, the data request receiver 104 may receive a request via the network (e.g., from the authorized party 112 and/or other parties). Additionally or alternatively, the data request receiver 104 may receive requests via manual entry of the request into the data request receiver (e.g., by a person via a user interface). The example data request receiver 104 parses the request to determine the data that was requested to be transferred and/or determines whether the requesting party has authorization to receive the data. For example, in response to a request the data request receiver 104 may construct a query of the database 102 to instruct the database and/or the auxiliary data encoder 106 which data is to be encoded before it is transmitted.

The example auxiliary data encoder 106 of FIG. 1 receives the source data to be encoded (e.g., as individual data units, as a set of data units, etc.), encodes auxiliary information into the source data, and outputs encoded data (e.g., for distribution, for storage, etc.). A more detailed example of the auxiliary data encoder 106 is described below in conjunction with FIG. 2.

The example auxiliary data decoder 108 of FIG. 1 obtains data in which auxiliary information may be present (e.g., suspect data) and attempts to extract the auxiliary information based on the method used by the auxiliary data encoder 106 to encode auxiliary data into text data. In some examples, the auxiliary data decoder 108 attempts to extract auxiliary data from the suspect data using multiple decoding methods, each decoding method being based on a method used by the auxiliary data encoder 106 to encode data. The auxiliary data decoder 108 may obtain data to be decoded when, for example, the obtained data is suspected of having been distributed without authorization and/or the owner or source of the obtained data is to be demonstrated.

The example auxiliary data manager 110 of FIG. 1 provides auxiliary information to the auxiliary data encoder 106, which encodes the auxiliary information into text data. The example auxiliary data manager 110 also receives extracted auxiliary information from the auxiliary data decoder 108. The auxiliary data manager 110 compares extracted auxiliary information to auxiliary information provided to the auxiliary data encoder 106 to determine whether a match exists between auxiliary information provided to the auxiliary data encoder and auxiliary information extracted by the auxiliary data decoder 108. The example auxiliary data manager 110 maintains (e.g., logs) a record of the parties to whom data is distributed and the auxiliary information encoded into the data provided to the parties. Thus, the example auxiliary data manager 110 can determine a party to whom data including a particular watermark was distributed. In some examples, the auxiliary data manager 110 identifies the data as having been distributed from the database 102 or otherwise encoded via the auxiliary data encoder 106 when a match exists between auxiliary information provided to the auxiliary data encoder and auxiliary information extracted by the auxiliary data decoder 108.

Figure 2:
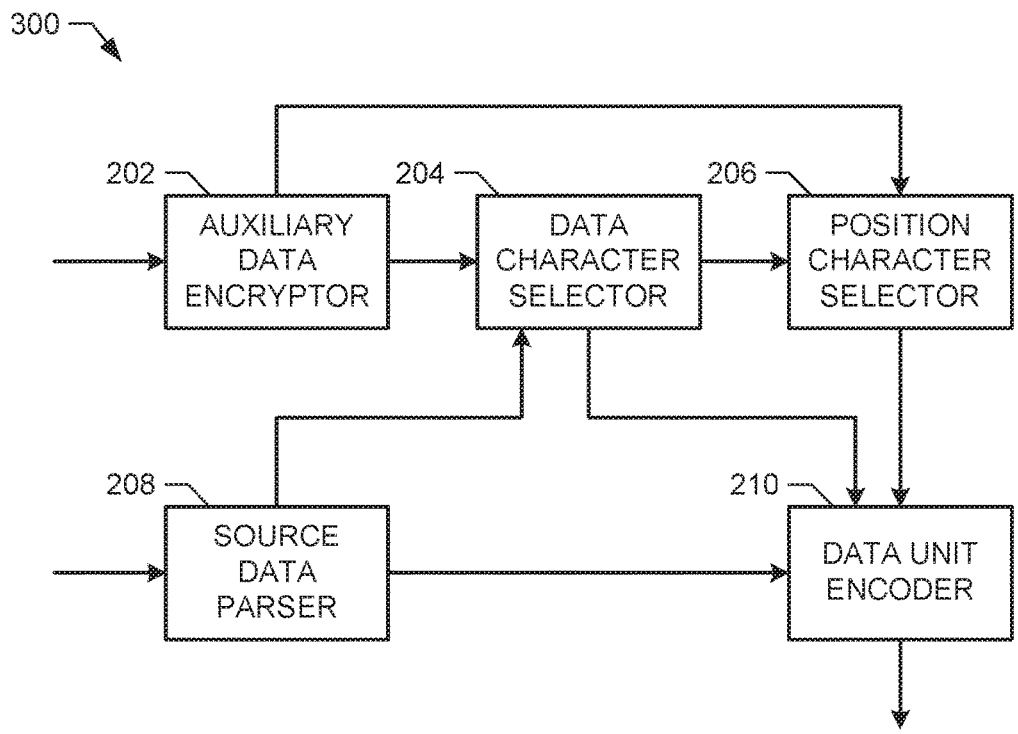
FIG. 2 is a more detailed block diagram of an example auxiliary data encoder to implement the system of FIG. 1 in accordance with the teachings of this disclosure.

FIG. 2 is a more detailed block diagram of an example auxiliary data encoder 200 to implement the system 100 of FIG. 1. The example auxiliary data encoder 200 of FIG. 2 may implement the auxiliary data encoder 106 of FIG. 1 to encode auxiliary data into source data (e.g., text data). Source data, as used herein, refers to data into which auxiliary information is to be encoded. Example source data may include lists of items, survey data, and/or any other type of data that may be represented by sets of text. In the example of FIG. 2, the auxiliary data encoder 200 encodes the auxiliary information in the source data in a binary format.

The auxiliary data encoder 200 of the illustrated example includes an auxiliary data encryptor 202, a data character selector 204, a position character selector 206, a source data parser 208, and a data unit encoder 210. The example auxiliary data encryptor 202 receives or otherwise obtains auxiliary data to be encoded into source data (e.g., from the auxiliary data manager 110 of FIG. 1). The example source data parser 208 receives or obtains source data including text (e.g., from the database 102 of FIG. 1). In some examples, the source data parser 208 serially receives data units and the auxiliary data encryptor 202 receives a string or other data to be encoded into the source data.

The example auxiliary data encryptor 202 encrypts received auxiliary data. Encryption may be performed using any encryption method. In some examples, the auxiliary data encryptor 202 receives a key to be used for encrypting the auxiliary data. By encrypting auxiliary data, the example auxiliary data encryptor makes the auxiliary data more difficult to detect in the encoded data relative to unencrypted auxiliary data.

The auxiliary data encryptor 202 provides the encrypted data to the data character selector 204 and to the position character selector 206. The example data character selector 204 of FIG. 2 selects all or a portion of the encrypted auxiliary data to be represented in a data unit. Based on the data to be represented, the example data character selector 204 selects a set of encoded characters (e.g., Unicode characters). The sets of encoded characters from which the data character selector 204 selects may be received from the example auxiliary data manager 110. For example, the data character selector 204 may select a symbol comprised of one or more Unicode characters from one of multiple sets of Unicode characters. The selected set of Unicode characters may be based on a desired data rate for the data unit and/or a potential for deletion or discovery of the encoded data in the data unit. Additionally, the symbol is selected to represent the data to be represented. Examples of selection of the set of encoded characters and the symbol are described in more detail below.

Table 1 illustrates example Unicode characters from which the sets of characters and/or symbols may be selected or formed.

TABLE 1

| | | | | | | |
|---|---|---|---|---|---|---|
| \| | U + 200A | 1/18 | HAIR SPACE | | | RegEx |
| \| | U + 2009 | 1/6 | THIN SPACE | | | RegEx |
| \| | U + 2006 | 1/6 | SIX-PER-EM SPACE | (1) | | RegEx |
| \| | U + 202F | 1/5 | NARROW NO-BREAK SPACE | | | RegEx |
| \| | U + 2008 | 1/3 | PUNCTUATION SPACE | | | RegEx |
| \| | U + 205F | 4/18 | MEDIUM MATH SPACE | | | RegEx |
| \| | U + 2005 | 1/4 | FOUR-PER-EM SPACE | (2) | Yes | Word |
| \| | U + 00A0 | 1/4 | NO-BREAK SPACE | (2) | Yes | Word |
| \| | U + 0020 | 1/4 | NORMAL SPACE | (2) | Yes | Word |
| \| | U + 2004 | 1/3 | THREE-PER-EM SPACE | (1) | | RegEx |
| \| \| | U + 2000 | 1/2 | EN QUAD | (1) | | RegEx |
| \| \| | U + 2007 | 1/2 | FIGURE SPACE | | | RegEx |
| \| \| | U + 2002 | 1/2 | EN SPACE | (1) | Yes | RegEx |
| \|\| | U + 200B | 0 | ZERO WIDTH SPACE | (3) | Yes | |
| \|\| | U + FEFF | 0 | ZERO WIDTH NO-BREAK SPACE | (3) | Yes | |
| \|\| | U + 200E | 0 | LEFT-TO-RIGHT MARK | | | |
| \|\| | U + 202A | 0 | LEFT-TO-RIGHT EMBEDDING | | | |
| \|\| | U + 202D | 0 | LEFT-TO-RIGHT OVERRIDE | | | |
| \|\| | U + 202C | 0 | POP DIRECTIONAL FORMATTING | | | |
| \|\| | U + 200F | 0 | RIGHT-TO-LEFT MARK | | | |

In Table 1, the first column illustrates the widths of each of the space character encodings (e.g., when decoded by a processor and displayed via an output device). The second column includes the Unicode encodings of the spaces, the third column includes the width of the spaces in units of em, and the fourth column provides the name of the space. In typography, an "em" refers to the width of a capital letter "M" for a given typefont.

The fifth column in Table 1 indicates whether each space is converted into a different white space character when copied and pasted from a Unicode editor application (e.g., an application that can decode and/or manipulate Unicode characters) to a non-Unicode application (e.g., an application that does not manipulate Unicode characters, but may decode the Unicode characters and/or transform Unicode characters into a similar or equivalent character in another format). The numeral (1) indicates that the characters are converted into white spaces of another format (e.g., ANSI format, ASCII format, etc.). The numeral (2) indicates that the characters are converted to white spaces in certain Unicode applications as well as non-Unicode applications. The numeral (3) indicates that the character is eliminated when copied and pasted to another application. Those characters with no numeral in the fifth column indicate that the Unicode characters are retained in Unicode format when copied and pasted, and may be displayed in non-Unicode applications as non-white space characters such as a box or question mark. This conversion may result in undesired discovery and/or elimination of the watermark from the data.

The sixth column of Table 1 indicates whether the Unicode characters are displayed in Microsoft® Word word processing application when the option to display formatting and/or hidden characters is enabled.

The seventh and rightmost column of Table 1 indicates whether the Unicode spaces are searchable, and in what ways. The characters marked "RegEx" are searchable as regular expressions, in which the characters are recognized as generic white spaces. The characters marked "Word" are searchable as regular expressions and in the Microsoft Word word processing application. Thus, data that includes Unicode characters may still be searched (e.g., text searched) using search queries including generic white spaces.

The example position character selector 206 of FIG. 2 receives the data from the auxiliary data encryptor 202 and the selection of the data to be represented and/or the selected set of Unicode characters by the data character selector 204. The example position character selector 206 determines a position of the selected data to be represented within the encrypted data. For example, if the data character selector 204 selects the most significant 8 bits out of encrypted data totaling 32 bits, the position character selector 206 selects a symbol (e.g., the binary number '11') to represent the most significant 8 bits. The position may be expressed using any method, such as expressing a location within the encrypted data of the most significant bit of the data to be represented, a range of bits in the encrypted data, or a location within the encrypted data of the least significant bit, and/or any other method of expressing the selected data. In some examples in which the data character selector 204 selects the entirety of the encrypted data, the example position character selector 206 may be omitted or bypassed.

The example source data parser 208 of FIG. 2 receives the source data (e.g., data units) including text. In some examples, the source data parser 208 generates data units from text. Generating the data units from the text may be performed using any method, such as dividing the text into an arbitrary number of words and/or dividing the text by an arbitrary delimiter. In some examples, the source data parser 208 determines a number of designated characters in the source data. In some such examples, data units having different numbers of the designated characters are assigned to different sets of groups corresponding to different symbols (e.g., to implement variable bit rate encoding in the source data).

The example source data parser 208 further determines a number of white spaces (or other designated character) within each data unit. Based on the number of white spaces, the source data parser 208 may provide to the data character selector 204 an upper amount of data that may be encoded into the data unit. The example data character selector 204 uses the upper amount of data when selecting the set of characters to represent the encrypted auxiliary data.

The example data unit encoder 210 of FIG. 2 generates encoded data units by including in the text data the selected symbol(s) to represent the selected data and/or to represent the position of the selected data in the encrypted data.

Examples of including the symbols in text data are described below. In some examples, the data unit encoder 210 of FIG. 2 replaces white space(s) present in the source text data with the symbols to generate encoded data that is visually substantially identical to the source text data (e.g., when decoded by a processor and an appropriate application and displayed via an output device such as a monitor). The data unit encoder 210 outputs the encoded data (e.g., to a requesting party, to be stored, etc.).

While the example auxiliary data encoder 200 of FIG. 2 includes the auxiliary data encryptor 202, other auxiliary data encoders 200 omit the auxiliary data encryptor 202 and encode unencrypted auxiliary data into the source data. In such examples, the data character selector 204 and the position character selector 206 receive the auxiliary data.

Figure 3:
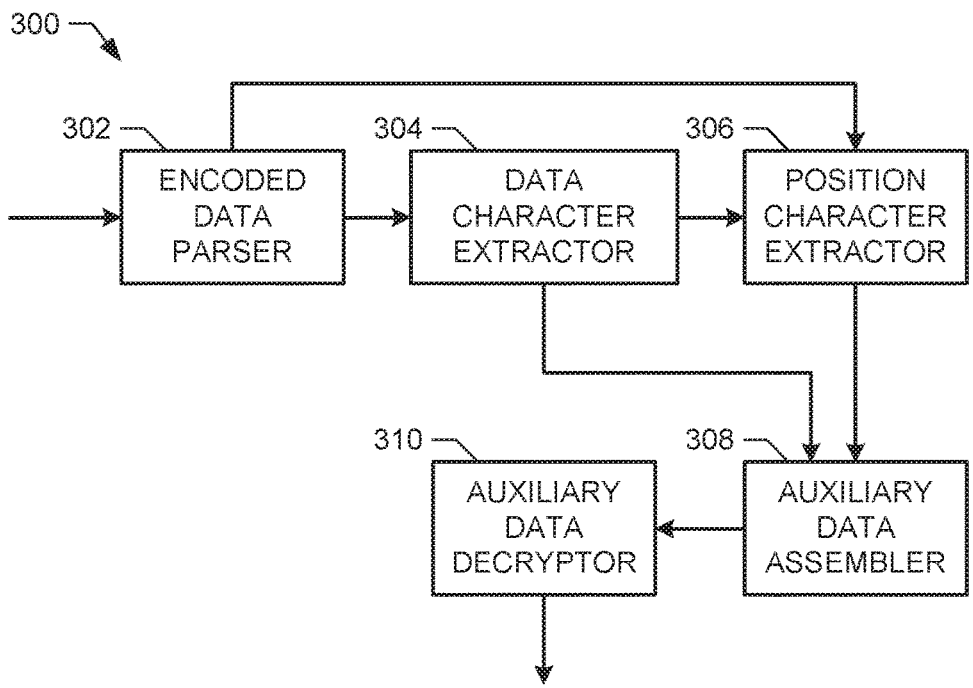
FIG. 3 is a more detailed block diagram of an example auxiliary data decoder to implement the system of FIG. 1 in accordance with the teachings of this disclosure.

FIG. 3 is a more detailed block diagram of an example auxiliary data decoder 300 to implement the system 100 of FIG. 1. The example auxiliary data decoder 300 of FIG. 3 may implement the auxiliary data decoder 108 of FIG. 1 to extract or decode auxiliary data from encoded data including text. The auxiliary data decoder 300 of the illustrated example includes an encoded data parser 302, a data character extractor 304, a position character extractor 306, an auxiliary data assembler 308, and an auxiliary data decryptor 310.

The example encoded data parser 302 of FIG. 3 obtains encoded data (or data suspected of containing encoded auxiliary data). For example, a set or subset of numeric data (e.g., measurement data) that is suspected (or known) to have been owned or sourced by a first party is found in the possession of another party not authorized to possess the data. In some examples, the encoded data parser 302 generates data units from the source data, while in other examples the encoded data parser 302 receives or obtains the encoded data as data units. In some examples, the encoded data parser 302 counts a number of visual white spaces (e.g., sequences of one or more white space characters) appearing as a single contiguous space between two non-white-space characters present in each encoded data unit.

The example encoded data parser 302 provides the data units to the data character extractor 304 and to the position character extractor 306. In examples in which the encoded data parser 302 counts the number of visual white spaces, the encoded data parser 302 also provides the count and/or an encoding bit rate determined based on the count. The example data character extractor 304 determines the symbols (e.g., the encodings of the white space characters) in the data units. For example, the data character extractor 304 determines the types of Unicode characters present in each visual white space of a data unit. In the example of FIG. 3, the data character extractor 304 determines the white space characters for a number of visual white spaces based on a bit rate determined from a total number of visual white spaces in the data unit.

The example position character extractor 306 determines the white space characters for a number of visual white spaces based on the bit rate. In some examples, the characters extracted by the position character extractor 306 represent different white spaces in the data unit than the characters extracted by the data character extractor 304.

The example data character extractor 304 decodes the extracted characters to obtain all or a portion of the auxiliary data encoded in the encoded data units. Similarly, the position character extractor 306 decodes the extracted characters to obtain a position of the portion extracted by the data character extractor 304 in auxiliary data. The data character extractor 304 and the position character extractor 306 may decode the extracted characters based on a mapping of character(s) to symbols and/or bits.

The data character extractor 304 provides the decoded data to the example auxiliary data assembler 308 of FIG. 3. Similarly, the position character extractor 306 provides the decoded position data to the auxiliary data assembler 308. Using the decoded data and/or the decoded position, the example auxiliary data assembler 308 determines all or a portion of the auxiliary data present in the encoded data. In some examples, only a portion of the auxiliary data is encoded in a data unit. Using the position data, the auxiliary data assembler 308 determines the portion of the auxiliary data represented by the decoded data received from the data character extractor 304.

In some other examples, the data extracted and decoded by the data character extractor 304 represents all of the auxiliary data encoded into the encoded data unit. In such examples, the position character extractor 306 and/or the auxiliary data assembler 308 may be omitted and the data character extractor 304 provides the decoded data to the auxiliary data decryptor 310 and/or outputs the auxiliary data if no decryption is necessary.

The example auxiliary data assembler 308 provides the assembled auxiliary data to the auxiliary data decryptor 310. The example auxiliary data decryptor 310 decrypts the assembled auxiliary data to obtain decrypted auxiliary data (e.g., the original auxiliary data to be encoded in the source data). The example auxiliary data decryptor 310 outputs the decrypted auxiliary data (e.g., to the auxiliary data manager 110 of FIG. 1). The decrypted auxiliary data may then be used to compare to previously-encoded auxiliary data and/or read to obtain information encoded as auxiliary data.

Figure 4:
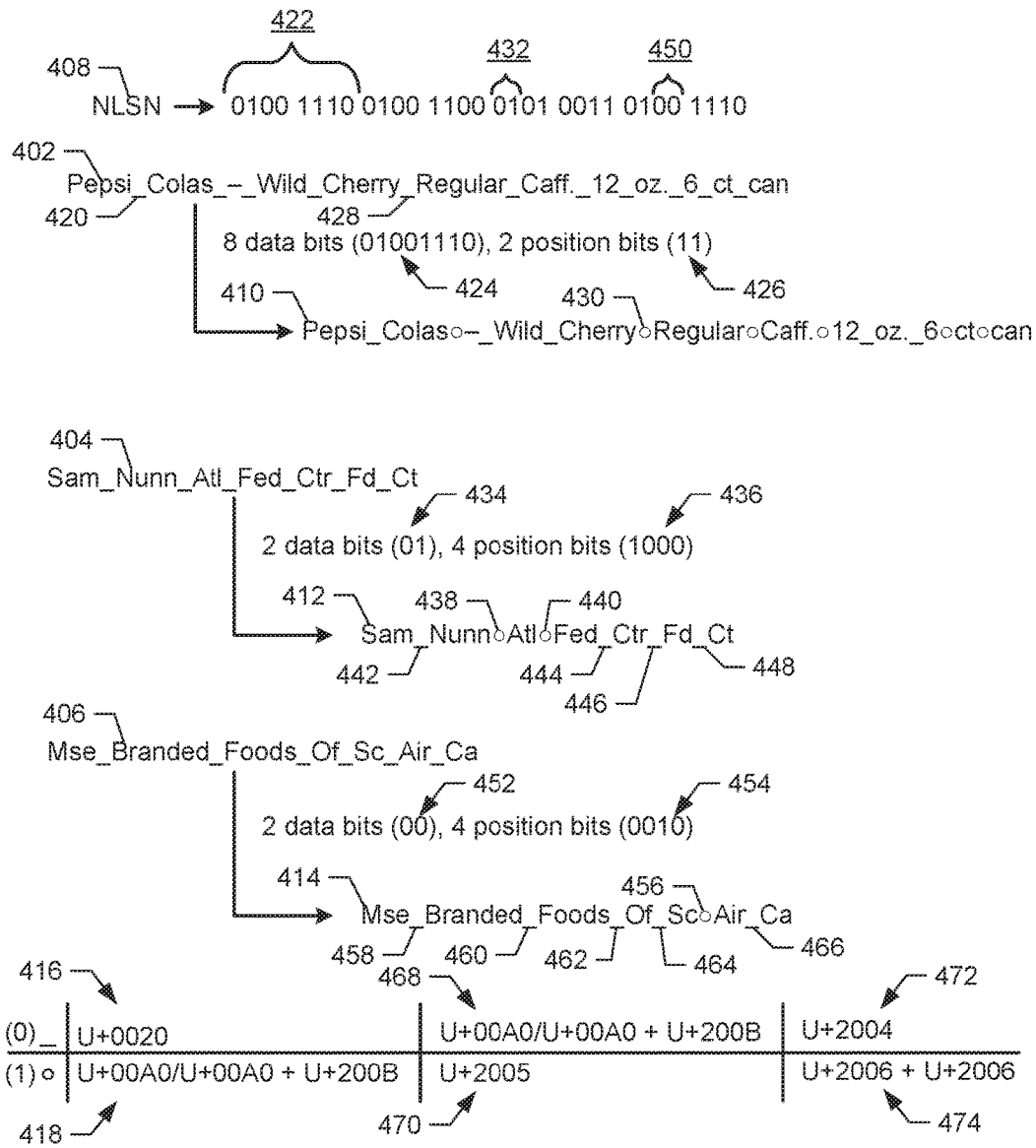
FIG. 4 illustrates example source data encoded with auxiliary data using a first example encoding method to generate encoded data in accordance with the teachings of this disclosure.

FIG. 4 illustrates example source data 402, 404, 406 encoded with auxiliary data 408 using a first example encoding method to generate encoded data 410, 412, 414. In the first example encoding method illustrated in FIG. 4, a symbol representing a single bit is encoded into each white space of the encoded data 410-414. In the example of FIG. 4, the watermark 408 is a 32-bit code, such as the ASCII binary representation of the characters "NLSN," to be inserted into respective source data units 402-406 to form the encoded data units 410-414.

To encode the first example source data unit 402, the source data parser 208 of FIG. 2 determines a number of white spaces 420 (e.g., normal spaces, or U+0020 characters), including the spaces 420, 428, in the data unit 402. The visual white spaces 420 of FIG. 4 are shown as "_" characters to illustrate their existence, but would generally be displayed as unoccupied spaces. The example source data unit 402 includes 11 white spaces 420. The source data parser 208 provides the source data unit 402 and the count of white spaces (e.g., 11) to the data character selector 204 and the position character selector 206 of FIG. 2.

Based on the count and the number of bits of the auxiliary data, the example data character selector 204 and the position character selector 206 determine that 8 bits of data and 2 position bits are to be encoded into the source data unit 402. The example data character selector 204 selects the most significant bits 422 of the watermark 408 to be encoded, and the position character selector 206 determines that the position data for the bits 422 is binary '11.' The example data character selector 204 may select the data pseudorandomly, may be provided the data (e.g., from the auxiliary data manager 110 of FIG. 1), and/or may select the data according to pre-defined criteria. While the position character selector 206 determines the position data for the bits 422 from the right in this example, the position character selector 206 may determine the position data using any other method or convention.

The example data character selector 204 of FIG. 2 determines a set of Unicode characters to be used to encode the data. In the example method of FIG. 4, the Unicode set represents a '0' bit with first white space character(s) 416 (e.g., a single normal space U+0020) and represents a '1' bit with second white space character(s) 418 (e.g., a single no-break space U+00A0).

The data unit encoder 210 encodes the selected data 424 and the position data 426 into the source data 402 to generate the encoded data 410. In the example of FIG. 4, the data unit encoder 210 encodes the data using the leftmost white spaces and encodes the position data using the rightmost white spaces. As a result, one unused white space is located between the white spaces used to encode the data and the white spaces used to encode the position data. To encode the data, the example data unit encoder 210 assigns each bit of the data 422 to one of the 8 leftmost white spaces (e.g., the most significant bit of the data 422 being assigned to the leftmost white space and the least significant bit of the data 422 being assigned to the rightmost white space of the 8 white spaces) and replaces the white spaces 420 in the source data 402 with designated symbols. For example, to encode a '1' bit, the example data unit encoder 210 replaces a corresponding white space character 428 with a different white space character 430 (e.g., Unicode non-breaking space character U+00A0). To encode a '0' bit, the example data unit encoder 210 does not modify the corresponding white space characters 420 (e.g., leaves the corresponding white space characters as Unicode normal space characters U+0020). Thus, in some examples, data units and/or portions of data units may be self-encoded.

The example encoded data unit 410 appears in a word processing application as "Pepsi Colas—Wild Cherry Regular Caff. 12 oz. 6 ct can," which has the same appearance as the source data 402. However, when the white space characters of the encoded data unit 410 are shown in parentheses, the encoded data unit 410 is encoded as "Pepsi(U+0020) Colas (U+00A0)–(U+0020)Wild(U+0020)Cherry(U+00A0) Regular(U+00A0)Caff(U+00A0)12 (U+0020)oz.(U+0020)6 (U+00A0)ct(U+00A0)can." The encoded data unit 410 is output by the data unit encoder 210.

The example encoding method for the encoded data 410 is ANSI-compatible, does not require a Unicode container, and enables text searching of the encoded data. However, the bit rate of the example method of FIG. 4 is relatively low.

The data unit encoder 210 encodes another portion 432 of the auxiliary data 408 into the source data 404 to generate encoded data 412. The example source data 404 includes 6 spaces. Thus, the example data character selector 204 and/or the example position character selector 206 determine that a symbol representing two data bits 434 and a symbol representing four position data bits 436 are to be encoded in the source data 404. The data bits 434 are assigned to be encoded to the 2 leftmost white spaces in the source data 404 and the position data bits 436 are assigned to be encoded to the 4 rightmost white spaces in the source data 404.

To encode the portion 432 of the auxiliary data 408 in the source data 404, the example data unit encoder 210 replaces the white space characters 438, 440 assigned to '1' bits with another symbol (e.g., the Unicode character U+2005) and modifies the white space characters 442-448 assigned to '0' bits to a second symbol (e.g., the combination of Unicode characters U+00A0 & U+200B). The resulting encoded data 412 has a visual appearance identical to that of the source data 404, because the symbols 438-448 representing the '0' bits and '1' bits are visually identical (e.g., have the same width). When the white space characters of the encoded data unit 412 are shown in parentheses, the encoded data unit 412 is encoded as "Sam(U+00A0)(U+200B)Nunn(U+2005)Atl (U+2005)Fed(U+00A0)(U+200B) Ctr(U+00A0)(U+200B) Fd(U+00A0)(U+200B)Ct." The encoded data unit 412 is output by the data unit encoder 210.

The example symbols 468, 470 used to encode the encoded data 412 may appear in certain Unicode applications (e.g., Microsoft Word when hidden formatting symbols are shown) to visually indicate the '0' bits and '1' bits. This feature can be used for debugging the example auxiliary data encoder 106 and/or the auxiliary data decoder 108 of FIG. 1. However, use of the symbols 468, 470 may also result in the watermark being more easily discovered. The risk of discovery may be partially mitigated because the symbols 468, 470 are converted to ordinary ASCII and/or ANSI space characters and/or disappear when copied to non-Unicode editor applications.

The example data unit encoder 210 encodes yet another portion 450 of the auxiliary data 408 into the source data 406 to generate encoded data 414. Like the example source data 404, the source data 406 includes 6 white spaces. Based on the number of white spaces in the source data 404, the example data character selector 204 and/or the example position character selector 206 determine that a symbol representing two data bits 452 and a symbol representing four position data bits 454 are to be encoded in the source data 406.

To encode the portion 450 of the auxiliary data 408 in the source data 406, the example data unit encoder 210 replaces the white space character 456 assigned to '1' bits with another symbol (e.g., the combination of Unicode characters U+2006 and U+2004) and modifies the white space characters 458-466 assigned to '0' bits.

The resulting encoded data 414 has a visual appearance identical to that of the source data 406. However, the space 456 representing the '1' bit is visually identical to the widths of the spaces 458-466 representing the '0' bits, because the U+2006 character is one-half of the width of the U+2004 character. When the white space characters of the encoded data unit 414 are shown in parentheses, the encoded data unit 414 is encoded as "Mse(U+2004)Branded(U+2004) Foods(U+2004)Of(U+2004)Sc(U+2006)(U+2006) Air(U+2004)Ca." The encoded data unit 414 is output by the data unit encoder 210.

The example encoding of the encoded data 412 uses symbols 470, 472 that do not appear as non-white space characters in some non-Unicode and/or Unicode editors (e.g., when hidden formatting symbols are shown in the Microsoft Word application). If transferred to certain non-Unicode editor applications, the symbol 472 is converted to ordinary white space characters, which preserves the watermark information. Thus, the example encoded data 414 is more resistant to discovery of the watermark than the example encoding of the encoded data 412.

To extract the watermark from the example encoded data 410-414, the encoded data parser 302 of FIG. 3 parses the encoded data 410-414 to determine a number of visual white spaces (e.g., 11 spaces for the encoded data 410, 6 spaces for the encoded data 412, and 6 spaces for the encoded data 414). Based on the number of visual white spaces, the data character extractor 304 and the position character extractor 306 extract the respective numbers of data symbols and/or position symbols from the encoded data 410-414.

For example, the data character extractor 304 extracts the 8 data symbols from the 8 leftmost white spaces of the encoded data 410, and maps the data symbols to the bits represented by the symbols 416, 418 to obtain the encoded data. The position character extractor 306 extracts the 2 position data symbols from the 2 rightmost white spaces of the encoded data.

The data character extractor 304 provides the extracted data to the auxiliary data assembler 308, and the position character extractor 306 provides the extracted position information to the auxiliary data assembler 308. Using the position information, the auxiliary data assembler 308 determines that the extracted data represents the 8 leftmost bits of the auxiliary data 408. The example encoded data parser 302, the example data character extractor 304, the example position character extractor 306, and the example auxiliary data assembler 308 repeat the process of extracting the data symbols and position symbols and mapping the extracted symbols to bits for the encoded data 412 and 414 to obtain the portions 432, 450 of the auxiliary data, and for additional encoded data units until symbols for all of the auxiliary data 408 have been obtained. The example auxiliary data assembler 308 may verify portions of the auxiliary data 408 as encoded data units representing the same portions of the auxiliary data 408 are decoded. When the auxiliary data 408 has been assembled and/or decrypted (as necessary), the example auxiliary data decoder 300 outputs the extracted auxiliary data for comparison with other data and/or to read the information contained in the auxiliary data.

Figure 5:
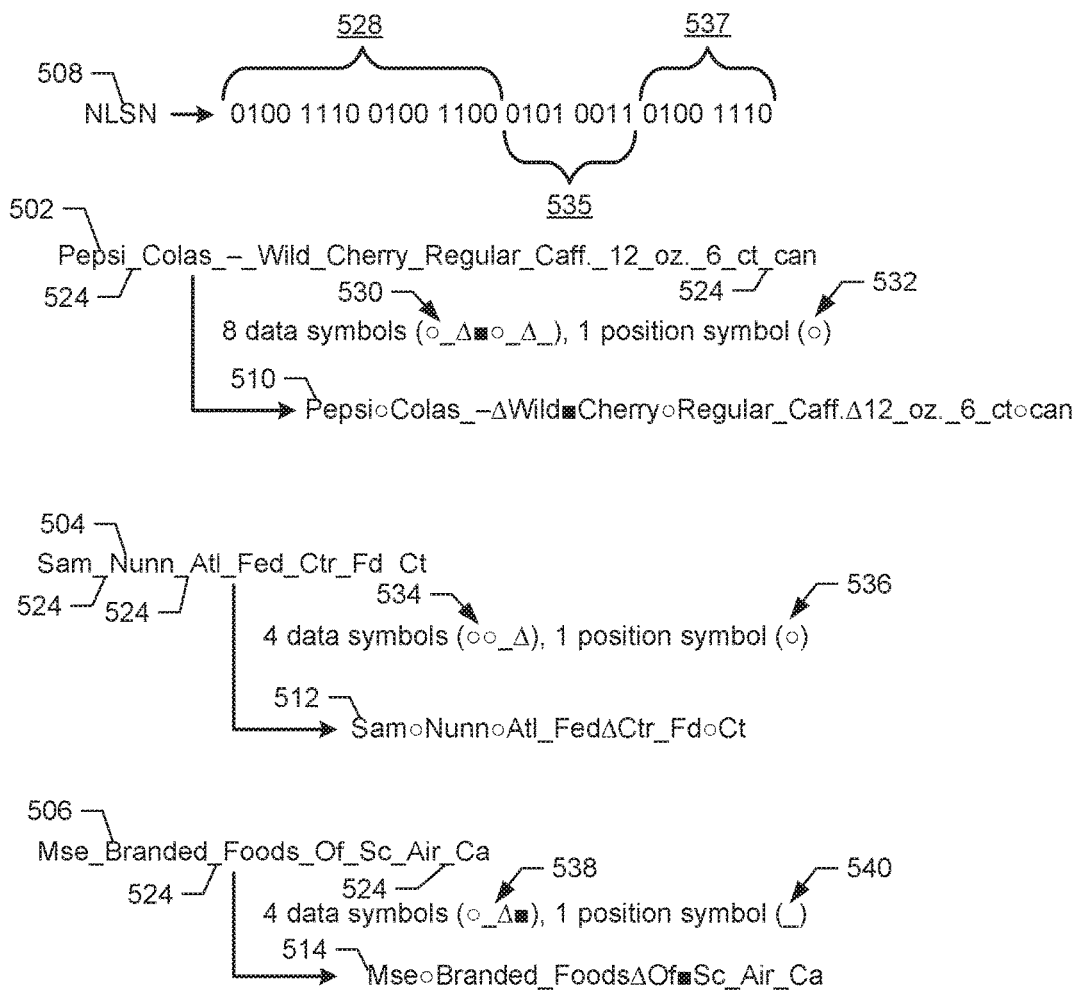
FIG. 5 illustrates example source data encoded with auxiliary data using a second example encoding method to generate encoded data in accordance with the teachings of this disclosure.

FIG. 5 illustrates example source data 502, 504, 506 encoded with auxiliary data 508 using a first example encoding method to generate encoded data 510, 512, 514. In the example of FIG. 5, a 32-bit watermark 508, such as the ASCII binary representation of the characters "NLSN," is to be inserted into respective source data units 502-506 to form the encoded data units 510-514. In contrast to the example encoding methods of FIG. 4, the example encoding method of FIG. 5 uses a set of symbols 516-522 (e.g., one or more Unicode characters) to encode information into the white spaces 524 of the source data units to generate encoded data, where a symbol represents multiple bits.

Compared with the example method of FIG. 4, the example encoding method of FIG. 5 enables a higher encoding bit rate. While less than all of the auxiliary data 408 was capable of being encoded in the encoded data units 410-414 using the methods of FIG. 4, the example watermark 508 may be completely encoded into the example source data 502-506. To encode at a higher density, the example data character selector 204 of FIG. 2 inserts (e.g., replaces the white space with) multiple characters per white space. As in the example of FIG. 4, the source data parser 208 of FIG. 2 determines a number of white spaces for each of the source data units 502-506 and provides the numbers of white spaces to the data character selector 204 and to the position character selector 206.

In the example of FIG. 5, the data character selector 204 selects a set of symbols representative of a wider white space than the example of FIG. 4, such as a ½ em space width. Using a ½ em space width, the example data character selector 204 may select from a set of four symbols (e.g., character combinations) to encode 2 bits of data in each visual space (e.g., space between words). An example mapping of character combinations to the symbols 516-522 (e.g., bits) that result in a rendering a substantially similar or identical visual space is illustrated in FIG. 5.

To encode a portion 528 of the watermark 508 in the source data 502, the example data character selector 204 maps the portion 528 to the symbols 516-522 to obtain data symbols 530. The example position character selector 206 maps the position information to one of the two symbols 516, 518 to obtain a position symbol 532. When used as the position data symbol 532, the symbol 516 signifies that the data symbols 530 represent the leftmost 16 bits of the watermark 508 and the symbol 518 signifies that the data symbols 530 represent the rightmost 16 bits of the watermark 508. However, the symbols 516, 518 may be used indicate other portions of the watermark, such as alternating bits, inside and/or outside bits, and/or any other portions of the watermark. In some other examples, the position character selector 206 may select from the symbols 520, 522 as well as the symbols 516, 518 to enable encoding of the middle 16 bits, the outside 16 bits, and/or any other additional selections of bits from the watermark 508.

The example data unit encoder 210 receives the data symbols 530 and the position data symbols 532 and replaces the white spaces 524 in the source data unit 502 with the corresponding symbols 530, 532 to obtain the encoded data unit 510. The example encoded data unit 510 appears in a word processing application as "Pepsi Colas—Wild Cherry Regular Caff. 12 oz. 6 ct can," where each visual white space has a width of ½ em. However, when the data symbols 530, 532 of the encoded data unit 510 are shown in parentheses, the encoded data unit 510 is encoded as "Pepsi(U+2006)(U+2004)Colas (U+2000)–(U+2006)(U+2006)(U+2006)Wild(U+2004)(U+2006)Cherry(U+2006) (U+2004)Regular (U+2000)Caff.)–(U+2006)(U+2006)(U+2006)12(U+2000) oz (U+2000)6(U+2000)ct(U+2000)can." The encoded data unit 510 is output by the data unit encoder 210.

The example source data unit 504 is encoded with data symbols 534 representing a portion 535 of the watermark 508 and a position data symbol 536 representing a position of the portion 535 within the watermark 508, to generate the encoded data unit 512. When the data symbols 534, 536 of the encoded data unit 512 are shown in parentheses, the encoded data unit 512 is encoded as "Sam(U+2006)(U+2004)Nunn(U+2006)(U+2004)Atl (U+2000)Fed(U+2006)(U+2006)(U+2006)Ctr(U+2000)Fd(U+2006)(U+2004)Ct." The source data unit 506 is encoded with data symbols 538 representing a portion 537 of the watermark 508, and a position data symbol 540 representing a position of the portion 537 within the watermark 508, to generate the encoded data unit 514. When the data symbols 538, 540 of the encoded data unit 514 are shown in parentheses, the encoded data unit 514 is encoded as "Mse(U+2006)(U+2004)Branded(U+2000)Foods(U+2006)(U+2006) (U+2006)Of(U+2004)(U+2006)Sc (U+2000)Air(U+2000) Ca."

Each of the example Unicode characters U+2000, U+2004, and U+2006 used in this example are converted to normal spaces when copied into non-Unicode editor. These characters also show as ordinary space characters in some Unicode-aware editors. As a result, the example character combinations are not easily discovered. However, use of the example characters U+2000, U+2004, and U+2006 may result in the watermark being eliminated from the data if the encoded data 510-514 is copied into certain word processing or text editing applications.

In other example methods, the data character selector 204 selects symbols that are combinations of other Unicode space characters having different widths, such as U+200A (1/18 em), U+2009 (1/6 em), U+202F (1/5 em), U+2008 (1/3 em) and U+205F (4/18 em), to encode higher data bit rates without visually appearing substantially different than a blank space. However, when copied to certain non-Unicode editor applications, these characters may show as question marks or other non-white space characters.

The example data character selector 204 may use combinations of characters, including U+200A (1/18 em), U+2009 (1/6 em), U+202F (1/5 em), U+2008 (1/5 em), and/or U+205F (4/18 em), that sum to approximately the same widths (e.g., between about 1/3 em to about 1/2 em) to encode at higher bit rates than the previous examples. For example, the widths of any 2 of the four characters U+2006, U+2009, U+202F, and U+2008 will sum to a width of about 1/3 em. Including combinations including two of the same character, the data character selector 204 may choose between 16 combinations (e.g., symbols) of two characters. Thus, in such examples, the data character selector 204 may encode up to four bits of information into one visual space (e.g., a space between words, a space between sentences, etc.).

In some examples, the data character selector 204 selects combinations including the characters U+2006, U+2009, U+202F, and U+2008 as described above, and further including a small-width Unicode character U+200A to add three combinations for each Unicode space above. For example, the character U+2006 may be combined with two U+200A characters to create the following combinations: (1) U+2006 & U+200A & U+200A, (2) U+200A & U+2006 & U+200A, and (3) U+200A & U+200A & U+2006.

In addition to the combinations in the previous example, the additional combinations provide a total of 28 combinations to represent data and/or location information in the text. The example data character selector 204 may select from the combinations to encode the auxiliary information in the source text data.

In some other examples, the data character selector 204 selects from combinations of white space characters whose widths sum to approximately 1/2 em. Using the 1/2 em total space, the data character selector 204 may select between at least 64 combinations of characters (e.g., 6 or more bits) per white space to represent the example data.

Figure 6:
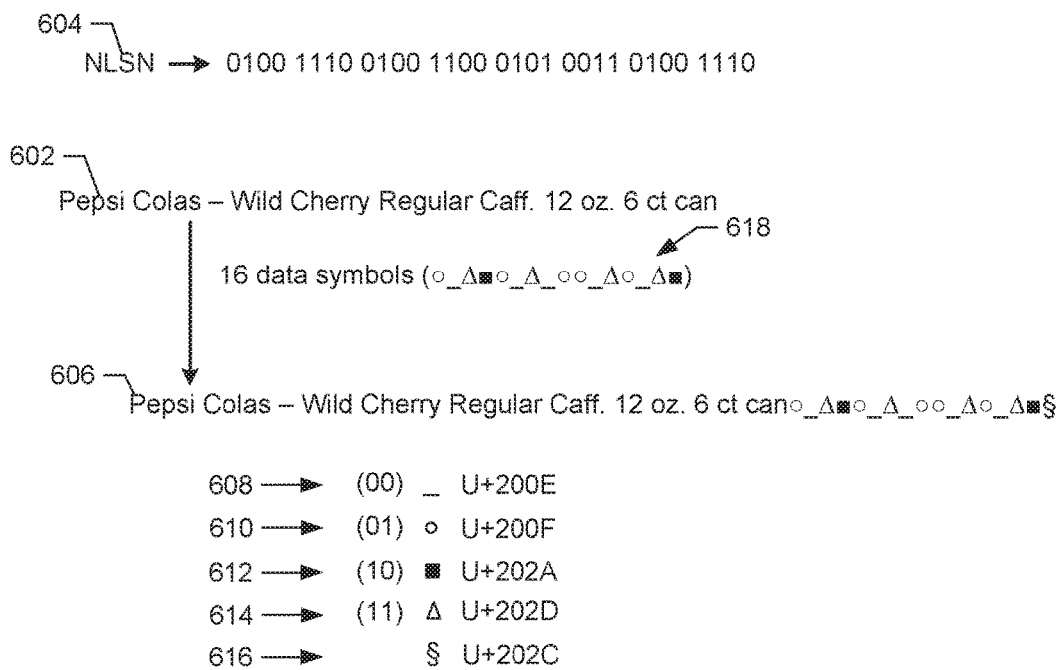
FIG. 6 illustrates example source data encoded with auxiliary data using a third example encoding method to generate encoded data in accordance with the teachings of this disclosure.

FIG. 6 illustrates example source data 602 encoded with auxiliary data 604 using a third example encoding method to generate encoded data 606. In the example of FIG. 6, a 32-bit watermark 604, such as the ASCII binary representation of the characters "NLSN," is to be inserted into the source data units 602 to form the encoded data unit 606. In contrast to the example encoding methods of FIGS. 4 and/or 5, the example encoding method of FIG. 6 uses a set of symbols including combinations of zero-width Unicode characters (e.g., U+200B, U+FEFF) and/or flow control characters (e.g., U+200E, U+200F, U+202A, U+202D) to represent the watermark 604. Flow control characters are used to control the flow in bi-directional texts, and are not visible in Unicode applications. In examples in which left-to-right order is used when exchanging data, the data character selector 204 may select the left-to-right control symbols to encode data without being visible. Using the example zero-width Unicode characters and/or flow control characters, a substantially unlimited amount of data may be encoded into each encoded data unit regardless of its size or number of white spaces. However, the example auxiliary data encoder 200 may be limited by size considerations of a data file including the encoded data 602.

In the example of FIG. 6, the data character selector 204 selects from symbols 608-614, where each symbol 608-614 is represented by a respective Unicode flow control character. An additional symbol 616 is represented by a U+202C (POP DIRECTIONAL FORMATTING) character. The example symbol 616 is placed at the end of a sequence of symbols encoded in the encoded data 606 to indicate the end of a sequence of encoded symbols representing the watermark 604.

In the example of FIG. 6, the data character selector 204 determines a sequence 618 of the symbols 608-616 to represent the watermark 604. The example data unit encoder 210 inserts the selected sequence 618 at the end of the source data unit 602 to generate the encoded data unit 606. The example data character extractor 304 of FIG. 3 may extract the watermark 604 from the encoded data unit 606 by mapping the sequence 618 of the symbols 608-616 to data bits. When the data character extractor 304 reaches the U+202C symbol 616, the data character extractor 304 determines that the entire watermark 604 has been extracted from the encoded data 606.

In some other examples, portions of the watermark 604 and corresponding position data may be encoded into multiple encoded data units. By encoding portions of the watermark into different encoded data units, the size of the data file including the encoded data units may be reduced while maintaining robustness of the encoded data to data shuffling, reordering, and/or partial deletion.

The example method of FIG. 6 provides a higher bit rate encoding scheme than the example methods of FIGS. 4 and/or 5, and does not impact the ability to perform text searches of the encoded data unit 606, because the symbols are inserted at end of the text in the encoded data unit 606. However, the example method of FIG. 6 may not preserve the encoding if the data is transferred to a non-Unicode file or application.

While example manners of implementing the system 100 of FIG. 1 has been illustrated in FIGS. 2 and/or 3, one or more of the elements, processes and/or devices illustrated in FIGS. 2 and/or 3 may be combined, divided, re-arranged, omitted, eliminated and/or implemented in any other way. Further, the example database 102, the example data request receiver 104, the example auxiliary data manager 110, the example auxiliary data encryptor 202, the example data character selector 204, the example position character selector 206, the example source data parser 208, the example data unit encoder 210, the example encoded data parser 302, the example data character extractor 304, the example position character extractor 306, the example auxiliary data assembler 308, the example auxiliary data encryptor 310 and/or, more generally, the example auxiliary data encoder 106, 200 and/or the example auxiliary data decoder 108, 300 of FIGS. 1-3 may be implemented by hardware, software, firmware and/or any combination of hardware, software and/or firmware. Thus, for example, any of the example database 102, the example data request receiver 104, the example auxiliary data manager 110, the example auxiliary data encryptor 202, the example data character selector 204, the example position character selector 206, the example source data parser 208, the example data unit encoder 210, the example encoded data parser 302, the example data character extractor 304, the example position character extractor 306, the example auxiliary data assembler 308, the example auxiliary data encryptor 310 and/or, more generally, the example auxiliary data encoder 106, 200 and/or the example auxiliary data decoder 108, 300 could be implemented by one or more circuit(s), programmable processor (s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example database 102, the example data request receiver 104, the example auxiliary data manager 110, the example auxiliary data encryptor 202, the example data character selector 204, the example position character selector 206, the example source data parser 208, the example data unit encoder 210, the example encoded data parser 302, the example data character extractor 304, the example position character extractor 306, the example auxiliary data assembler 308, and/or the example auxiliary data encryptor 310 are hereby expressly defined to include a tangible computer readable storage medium such as a memory, DVD, CD, Blu-ray, etc. storing the software and/or firmware. Further still, the example the example auxiliary data encoder 106, 200 and/or the example auxiliary data decoder 108, 300 of FIGS. 1-3 may include one or more elements, processes and/or devices in addition to, or instead of, those illustrated in FIGS. 1-3, and/or may include more than one of any or all of the illustrated elements, processes and devices.

Figure 7:
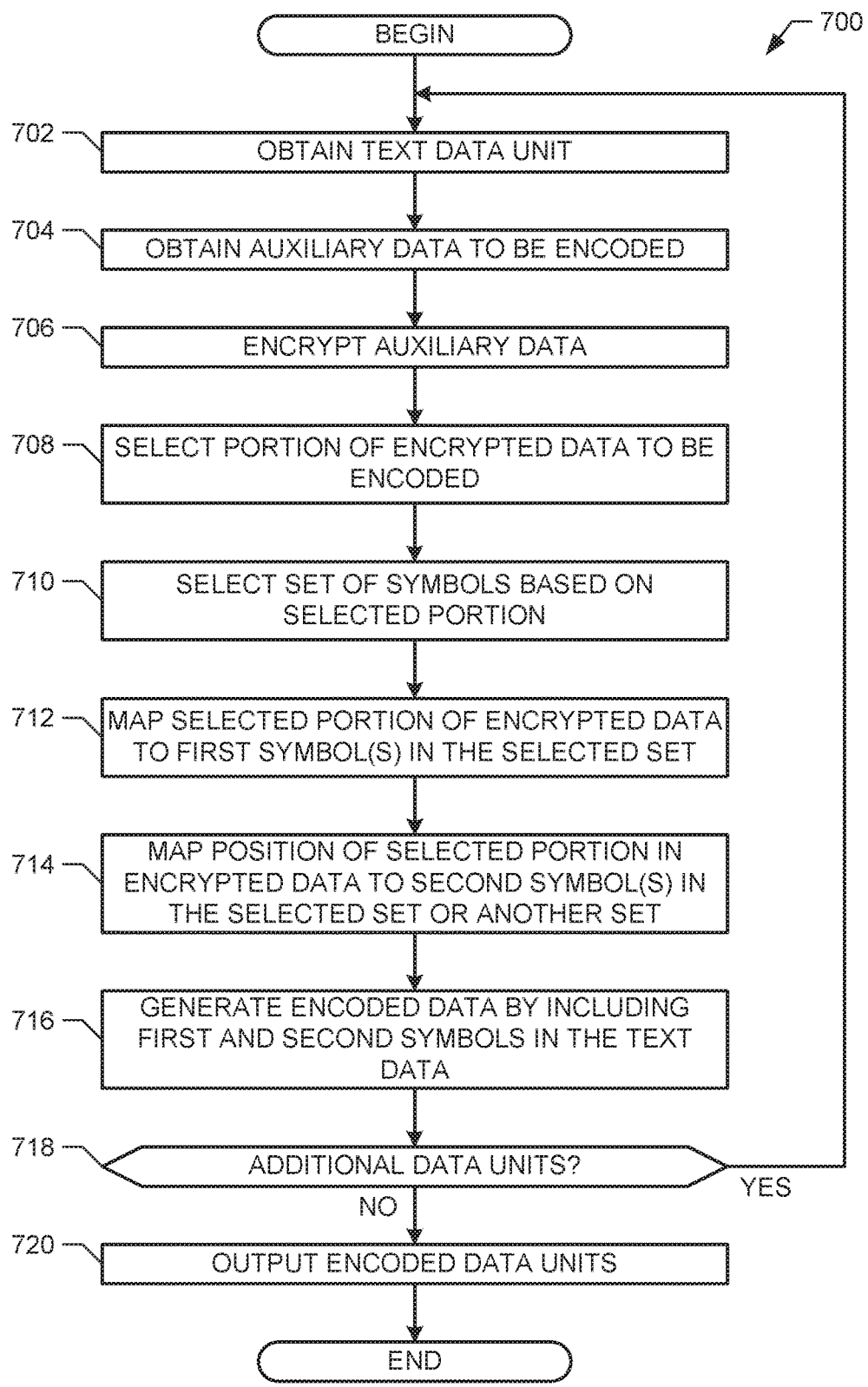
FIG. 7 is a flowchart representative of example machine readable instructions which may be executed to implement the auxiliary data encoder of FIG. 2 to encode auxiliary data into text data.
Figure 8:
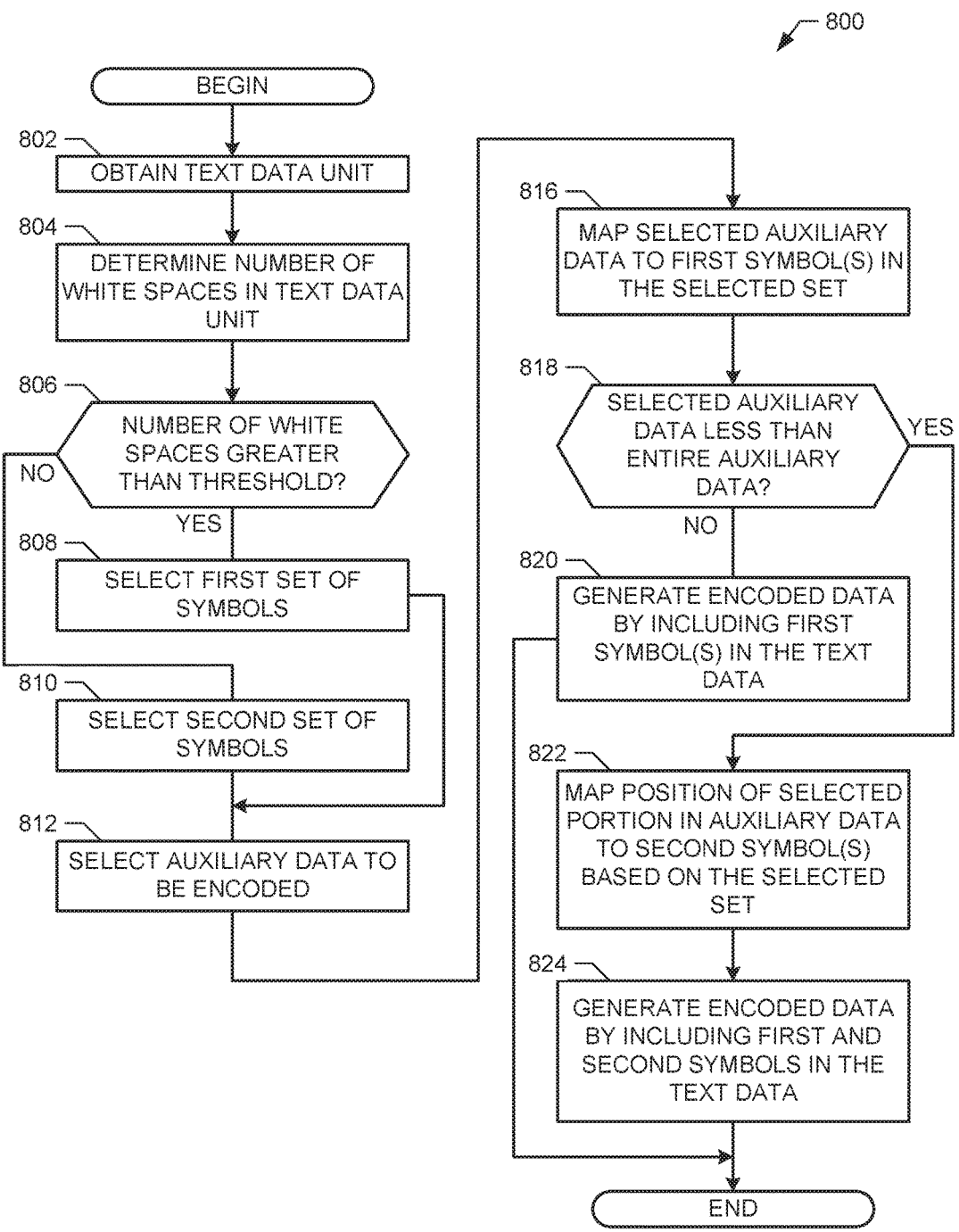
FIG. 8 is a flowchart representative of example machine readable instructions 800 which may be executed to implement the auxiliary data encoder of FIG. 2 to encode auxiliary data into text data.
Figure 9:
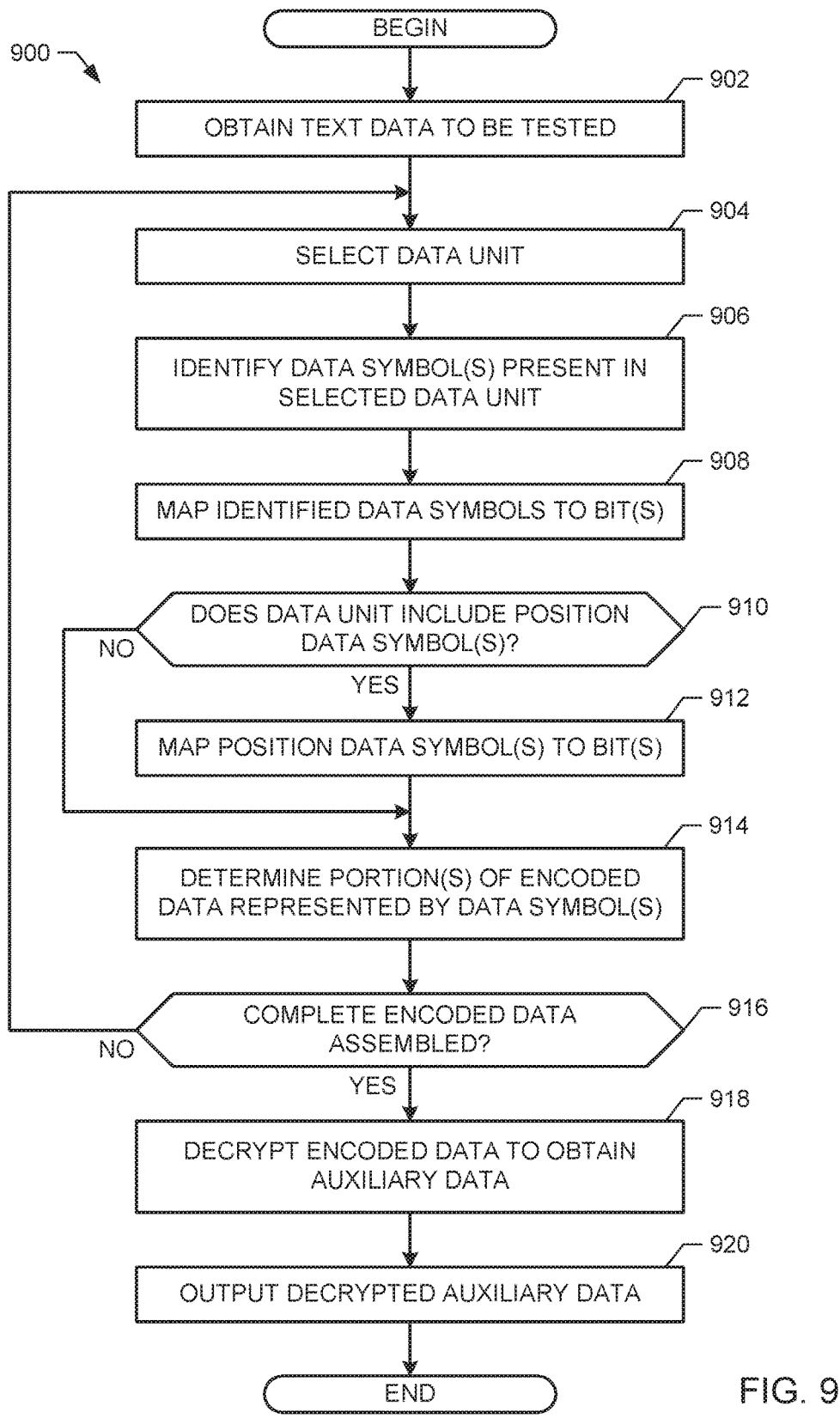
FIG. 9 is a flowchart representative of example machine readable instructions which may be executed to implement the auxiliary data decoder of FIG. 3 to obtain auxiliary data encoded into text data

Flowcharts representative of example machine readable instructions for implementing the example auxiliary data encoder 200 of FIG. 2 are shown in FIGS. 7 and 8. A flowchart representative of example machine readable instructions for implementing the example auxiliary data decoder 300 of FIG. 3 is shown in FIG. 9. In this example, the machine readable instructions comprise programs for execution by a processor such as the processor 1012 shown in the example processor platform 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire programs and/or parts thereof could alternatively be executed by a device other than the processor 1012 and/or embodied in firmware or dedicated hardware. Further, although the example programs are described with reference to the flowcharts illustrated in FIGS. 7-9, many other methods of implementing the example auxiliary data encoder 200 and/or the example auxiliary data decoder 300 may alternatively be used. For example, the order of execution of the blocks may be changed, and/or some of the blocks described may be changed, eliminated, or combined.

As mentioned above, the example processes of FIGS. 7-9 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage and to exclude propagating signals. Additionally or alternatively, the example processes of FIGS. 7-9 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 7 is a flowchart representative of example machine readable instructions 700 which may be executed to implement the auxiliary data encoder 200 of FIG. 2 to encode auxiliary data into text data. The example instructions 700 may be performed, for example, to embed a watermark, such as an identifier or copyright information, into the text data prior to providing the text data to another party.

The example source data parser 208 of FIG. 2 obtains source data including text data units (block 702). In some examples, the source data parser 208 generates the data units from text data. The example auxiliary data encryptor 202 obtains auxiliary information to be encoded into the source data (block 704). The auxiliary data encryptor 202 encrypts the auxiliary information (block 706).

The example data character selector 204 of FIG. 2 selects a portion of the encrypted data to be encoded (block 708). The data character selector 204 selects a set of symbols based on the selected portion (block 710). For example, the data character selector 204 may select a set of symbols to encode a higher bit rate or a set of symbols to encode a lower bit rate. The symbols may be represented by combinations of one or more Unicode white space characters, zero-width characters, and/or flow control characters. The example data character selector 204 maps the selected portion of the encrypted data to first symbol(s) in the selected set (block 712). For example, the data character selector 204 may determine which of the symbols in the selected set of symbols represents the portion of encrypted data.

The example position character selector 206 of FIG. 2 maps a position of the selected portion of the encrypted data to a second symbol in the selected set or in another set of symbols (block 714). For example, the position character selector 206 may use the same selected set of symbols used to map the selected portion of encrypted data. The example data unit encoder 210 generates encoded data by including the first and second symbols in the text data unit (block 716). For example, the data unit encoder 210 may replace the white space characters in the source data with characters and/or combinations of characters that represent the symbols mapped to the portion of encrypted data and to the position data.

The example data unit encoder 210 determines whether there are additional unencoded source data units (block 718). If there are additional unencoded source data units (block 718), control returns to block 712 to select another source data unit to be encoded. When there are no additional data units (block 718), the example data unit encoder 210 outputs the encoded data (block 720). The encoded data may, for example, be transmitted or stored for future transmission.

FIG. 8 is a flowchart representative of example machine readable instructions 800 which may be executed to implement the auxiliary data encoder 200 of FIG. 2 to encode auxiliary data into text data. The example instructions 800 may be performed, for example, to embed a watermark, such as an identifier or copyright information, into the text data prior to providing the text data to another party.

The example source data parser 208 of FIG. 2 obtains source data including text data units (block 802). In some examples, the source data parser 208 generates the data units from text data. The example source data parser 208 determines a number of white spaces in the text data unit (block 804). For example, the source data parser 208 may determine a number of visual white spaces between words in the data unit.

The example data character selector 204 of FIG. 2 determines whether the number of spaces is greater than a threshold (block 806). The threshold may be based on a number of white spaces in the source data unit needed to achieve a particular encoding bit rate. If the number of white spaces is greater than the threshold (block 806), the example data character selector 204 selects a first set of symbols (block 808). If the number of white spaces is less than the threshold (block 806), the data character selector 204 selects a second set of symbols (block 810).

After selecting a set of symbols (block 808, 810), the example data character selector 204 selects auxiliary data to be encoded (block 812). The selected auxiliary data may be all or a portion of the auxiliary data to be encoded. The data character selector 204 maps the selected auxiliary data to first symbol(s) in the selected set (block 816). For example, the data character selector 204 may determine a sequence of multiple symbols (e.g., combinations of Unicode characters) in the selected set that represent the selected auxiliary data or portion of the auxiliary data.

The position character selector 206 determines whether the selected auxiliary data is less than the entire auxiliary data to be encoded (block 818). If the selected auxiliary data is equal to the entire auxiliary data (block 818), the example data unit encoder 210 generates the encoded data by including the first symbol(s) in the text data (block 820). For example, the data unit encoder 210 may replace some or all of the white spaces in the data unit with characters and/or combinations of characters representative of the symbols.

If the selected auxiliary data is a portion of the entire auxiliary data (block 818), the example position character selector 206 maps the position of the selected portion of the auxiliary data within the auxiliary data to second symbols based on the selected set of symbols (block 822). For example, the position character selector 206 may determine an identity of the selected portion of the auxiliary data (e.g., 1 of 4 eight-bit units in a 32-bit auxiliary data code) and map the determined identity to one of the symbols. The example data unit encoder 210 generates the encoded data by including the first symbol(s) and the second symbol(s) in the text data (block 824). For example, the data unit encoder 210 may replace a first set of white spaces in the data unit with the first symbol(s) and replace a second set of white spaces in the data unit with the second symbol(s).

After generating the encoded data (block 820 or block 824), the example instructions 800 may end and/or iterate to generate additional encoded data.

FIG. 9 is a flowchart representative of example machine readable instructions 900 which may be executed to implement the auxiliary data decoder 300 of FIG. 3 to obtain auxiliary data encoded into text data. The example instructions 900 of FIG. 9 may be performed to, for example, identify copyrighted data and/or to extract information such as a watermark that is encoded into text data.

The example encoded data parser 302 of FIG. 3 obtains text data to be tested (block 902). In some examples, the encoded data parser 302 generates data units from the obtained data. The example encoded data parser 302 of FIG. 3 selects a data unit (block 904). In some examples, the encoded data parser 302 determines a number of visual white spaces in the selected data unit.

The data character extractor 304 identifies data symbol(s) present in the selected data unit (block 906). For example, the data character extractor 304 may determine combinations of Unicode white space characters, zero-width characters, and/or flow control characters in each of the example white spaces of the selected data unit. The data character extractor 304 maps the identified data symbols to bits (block 908). For example, the data character extractor 304 may determine a set of symbols corresponding to the identified symbols (e.g., a set of symbols including each of the identified symbols, a set of symbols including a threshold number or fraction of the identified symbols, etc.) and map the identified symbols to corresponding bits based on the set of symbols.

The example position character extractor 306 determines whether the data unit includes position data symbol(s) (block 910). For example, the position character extractor 306 may determine that the data unit includes position data symbol(s) based on a number of white spaces in the data unit. If the data unit includes position data symbol(s) (block 910), the example position character extractor 306 maps the position data symbols to bits (block 912). For example, the position character extractor 306 may map the position data symbols to an identifier of the bits of the watermark that are represented by the data symbol(s).

The example auxiliary data assembler 308 determines the portion(s) of the encoded data represented by the data symbols (block 914). For example, if the auxiliary data assembler 308 receives position data from the position character extractor 306, the auxiliary data assembler 308 determines the portion of the encoded data that is represented by the data symbols. On the other hand, if there is no position data, the example auxiliary data assembler 308 may determine that the data symbols represent the entire encoded data.

The auxiliary data assembler 308 determines whether the complete encoded data is assembled (block 916). For example, the auxiliary data assembler 308 may determine whether sufficient data symbols and/or position data has been received and assembled to recover the entire encoded data. If the encoded data is divided among multiple data units, the example auxiliary data assembler 308 may determine whether additional data units have to be decoded to obtain any missing portions of the encoded data. If the complete encoded data is not assembled (block 916), control returns to block 904 to select another data unit.

When the complete encoded data is assembled (block 916), the example auxiliary data decryptor 310 decrypts the encoded data to obtain auxiliary data (block 918). The example auxiliary data decryptor 310 outputs the decrypted auxiliary data (block 920). For example, the decrypted auxiliary data may be used for comparison to auxiliary data encoded into source data to determine a match and/or to obtain information encoded into the data. The example instructions 900 may then end and/or iterate to obtain another watermark from text data.

Figure 10:
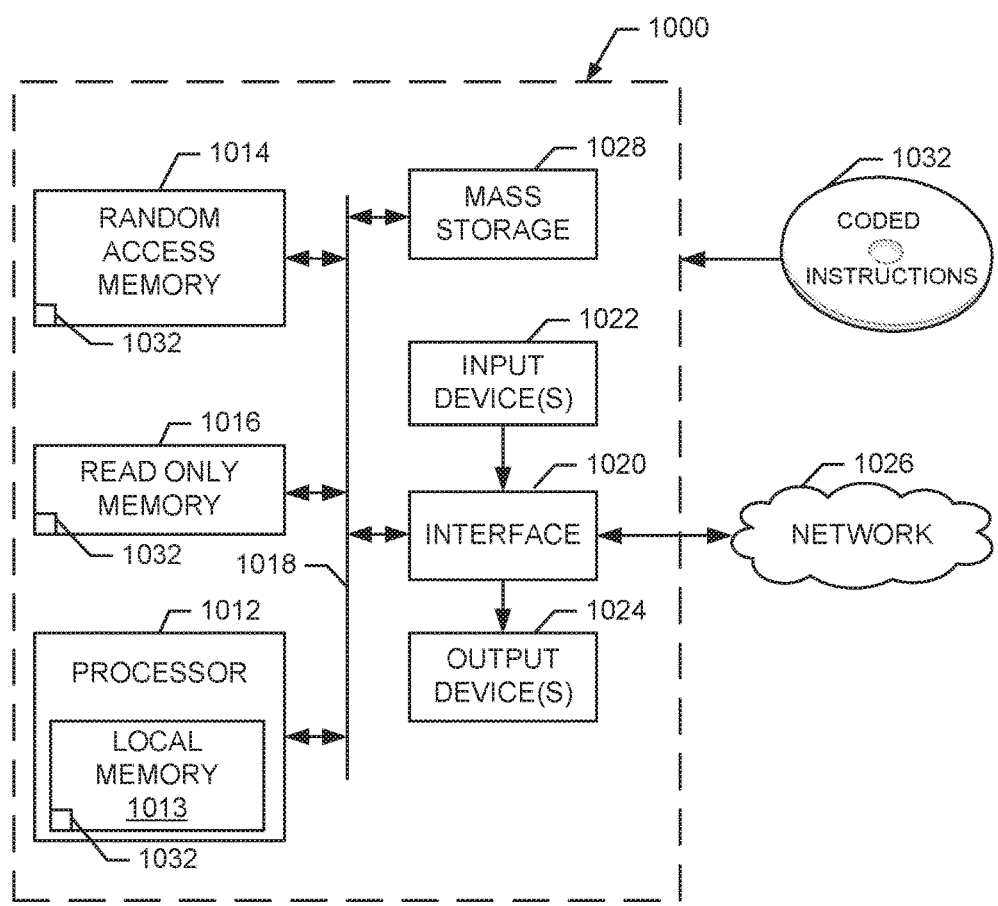
FIG. 10 is a block diagram of an example processor platform capable of executing the instructions of FIGS. 7-9 to implement the apparatus of FIGS. 2 and/or 3.

FIG. 10 is a block diagram of an example processor platform 1000 capable of executing the instructions of FIGS. 7, 8, and/or 9 to implement the auxiliary data encoder 200 and/or the auxiliary data decoder 300 of FIGS. 1-3. The processor platform 1000 can be, for example, a server, a personal computer, an Internet appliance, or any other type of computing device.

The processor platform 1000 of the instant example includes a processor 1012. For example, the processor 1012 can be implemented by one or more microprocessors or controllers from any desired family or manufacturer.

The processor 1012 includes a local memory 1013 (e.g., a cache) and is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a voice recognition system, and/or any other method of input or input device.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device such as a modem or network interface card to facilitate exchange of data with external computers via a network 1026 (e.g., an Ethernet connection, a digital subscriber line (DSL), a telephone line, coaxial cable, a cellular telephone system, etc.).

The processor platform 1000 also includes one or more mass storage devices 1028 for storing software and data. Examples of such mass storage devices 1028 include floppy disk drives, hard drive disks, compact disk drives and digital versatile disk (DVD) drives. The mass storage device 1028 may implement the database 102 of FIG. 1.

The coded instructions 1032 of FIGS. 7 and/or 8 may be stored in the mass storage device 1028, in the volatile memory 1014, in the non-volatile memory 1016, and/or on a removable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus to encode auxiliary data into text data, the apparatus comprising:
    a data character selector to:
       map a first portion of auxiliary data to a first set of one or more encoded characters to be included in the text data; and
       map a second portion of the auxiliary data to a second set of one or more encoded characters to be included in the text data;
    a source data parser to determine a number of white spaces in the text data;
    a position character selector to map respective positions of the first portion of the auxiliary data and the second portion of the auxiliary data within the auxiliary data to a third set of one or more encoded characters to be included in the text data based on the number of white spaces; and
    a data unit encoder to include the first set of one or more encoded characters, the second set of one or more encoded characters, and the third set of one or more encoded characters in the text data to encode the auxiliary data in the text data, the data character selector, the position character selector, the data unit encoder and the source data parser implemented by hardware or at least one hardware processor.

2. The apparatus of claim 1, wherein the first set of one or more encoded characters, the second set of one or more encoded characters and the third set of one or more encoded characters each include at least one Unicode white space character.

3. The apparatus of claim 2, wherein:
    the at least one Unicode white space character includes at least one of Unicode character U+2000, Unicode character U+2004, or Unicode character U+2006; and
    the data unit encoder is to use the at least one Unicode white space character included in each of the first set of one or more encoded characters, the second set of one or more encoded characters and the third set of one or more encoded characters to encode two bits of the auxiliary data in a visual space of the text data.

4. The apparatus of claim 2, wherein:
    the Unicode white space character includes at least one of Unicode character U+200A, Unicode character U+2009, Unicode character U+202F, Unicode character U+2008, or Unicode character U+205F; and
    the data unit encoder is to use the at least one Unicode white space character included in each of the first set of one or more encoded characters, the second set of one or more encoded characters and the third set of one or more encoded characters to encode four bits of the auxiliary data in a visual space of the text data.

5. The apparatus of claim 1, wherein the first set of one or more encoded characters and the second set of one or more encoded characters represent a substantially similar character width.

6. The apparatus of claim 1, wherein the data unit encoder is to include the first set of one or more encoded characters, the second set of encoded characters, and the third set of one or more encoded characters in the text data by:
    replacing a first white space character of the text data with the first set of one or more encoded characters;
    replacing a second white space character of the text data with the second set of one or more encoded characters; and
    replacing a third white space character of the text data with the third set of one or more encoded characters.

7. A non-transitory computer readable storage medium comprising computer readable instructions which, when executed, cause a processor to at least:
    map a first portion of auxiliary data to a first set of one or more encoded characters to be included in text data;
    map a second portion of the auxiliary data to a second set of one or more encoded characters to be included in the text data;
    determine a number of white spaces in the text data;
    map respective positions of the first portion of the auxiliary data and the second portion of the auxiliary data within the auxiliary data to a third set of one or more encoded characters to be included in the text data based on the number of white spaces; and
    encode the auxiliary data in the text data by including the first set of one or more encoded characters, the second set of one or more encoded characters, and the third set of one or more encoded characters in the text data.

8. The computer readable storage medium of claim 7, wherein the first set of one or more encoded characters, the second set of one or more encoded characters and the third set of one or more encoded characters each include at least one Unicode white space character.

9. The computer readable storage medium of claim 8, wherein the Unicode white space character includes at least one of Unicode character U+2000, Unicode character U+2004, or Unicode character U+2006, and the instructions, when executed, cause the processor to use the at least one Unicode white space character included in each of the first set of one or more encoded characters, the second set of one or more encoded characters and the third set of one or more encoded characters to encode two bits of the auxiliary data in a visual space of the text data.

10. The computer readable storage medium of claim 8, wherein the Unicode white space character includes at least one of Unicode character U+200A, Unicode character U+2009, Unicode character U+202F, Unicode character U+2008, or Unicode character U+205F, and the instructions, when executed, cause the processor to use the at least one Unicode white space character included in each of the first set of one or more encoded characters, the second set of one or more encoded characters and the third set of one or more encoded characters to encode four bits of the auxiliary data in a visual space of the text data.

11. The computer readable storage medium of claim 7, wherein the first set of one or more encoded characters and the second set of one or more encoded characters represent a substantially similar character width.

12. The computer readable storage medium of claim 8, wherein the instructions, when executed, cause the processor to:
replace a first white space character of the text data with the first set of one or more encoded characters;
replace a second white space character of the text data with the second set of one or more encoded characters; and
replace a third white space character of the text data with the third set of one or more encoded characters.

13. A method to encode auxiliary data into text data, the method comprising:
mapping, by executing an instruction with a processor, a first portion of auxiliary data to a first set of one or more encoded characters to be included in the text data;
mapping, by executing an instruction with the processor, a second portion of the auxiliary data to a second set of one or more encoded characters to be included in the text data;
determining, by executing an instruction with the processor, a number of white spaces in the text data;
mapping, by executing an instruction with the processor, respective positions of the first portion of the auxiliary data and the second portion of the auxiliary data within the auxiliary data to a third set of one or more encoded characters to be included in the text data based on the number of white spaces; and
encoding, by executing an instruction with the processor, the auxiliary data in the text data by including the first set of one or more encoded characters, the second set of one or more encoded characters, and the third set of one or more encoded characters in the text data.

14. The method of claim 13, wherein the first set of one or more encoded characters, the second set of one or more encoded characters and the third set of one or more encoded characters each include at least one Unicode white space character.

15. The method of claim 14, wherein the Unicode white space character includes at least one of Unicode character U+2000, Unicode character U+2004, or Unicode character U+2006, and the encoding of the auxiliary data in the text data includes encoding two bits of the auxiliary data in a visual space of the text data using the at least one Unicode white space character included in each of the first set of one or more encoded characters, the second set of one or more encoded characters and the third set of one or more encoded characters.

16. The method of claim 14, wherein the Unicode white space character includes at least one of Unicode character U+200A, Unicode character U+2009, Unicode character U+202F, Unicode character U+2008, or Unicode character U+205F, and the encoding of the auxiliary data in the text data includes encoding four bits of the auxiliary data in a visual space of the text data using the at least one Unicode white space character included in each of the first set of one or more encoded characters, the second set of one or more encoded characters and the third set of one or more encoded characters.

17. The method of claim 13, wherein the first set of one or more encoded characters and the second set of one or more encoded characters represent a substantially similar character width.

18. The method of claim 13, wherein the encoding of the auxiliary data includes:
replacing a first white space character of the text data with the first set of one or more encoded characters;
replacing a second white space character of the text data with the second set of one or more encoded characters; and
replacing a third white space character of the text data with the third set of one or more encoded characters.

* * * * *